United States Patent
Chisu et al.

(10) Patent No.: US 11,882,229 B1
(45) Date of Patent: Jan. 23, 2024

(54) FOLDABLE COMMUNICATION DEVICE WITH TWO ROLLABLE DISPLAYS

(71) Applicant: MOTOROLA MOBILITY LLC, Wilmington, DE (US)

(72) Inventors: Daniel C Chisu, Franklin Park, IL (US); Mohamad Z Abdi, Mount Prospect, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/194,339

(22) Filed: Mar. 31, 2023

(51) Int. Cl.
  *G06F 1/16* (2006.01)
  *H04M 1/02* (2006.01)
  *G06F 3/01* (2006.01)
  *G09G 3/00* (2006.01)

(52) U.S. Cl.
  CPC ........ *H04M 1/0268* (2013.01); *G06F 1/1652* (2013.01); *G06F 1/1681* (2013.01); *G06F 3/011* (2013.01); *G09G 3/035* (2020.08); *G09G 2354/00* (2013.01)

(58) Field of Classification Search
  CPC . H04M 1/0268; G09G 3/035; G09G 2354/00; G06F 1/1652; G06F 1/1681; G06F 3/011
  See application file for complete search history.

(56) References Cited

U.S. PATENT DOCUMENTS

2023/0297133 A1\* 9/2023 Lee ................... G06F 1/1677
  361/679.02

\* cited by examiner

*Primary Examiner* — Deeprose Subedi
(74) *Attorney, Agent, or Firm* — Isidore PLLC

(57) ABSTRACT

An electronic device, method, and computer program product respond to the electronic device extending flexible displays to a display area that can be almost four times larger than a collapsed position. A controller of the electronic device monitors a sensor configured to detect an unfolded open position of the dual device housing assembly and responds to a display positioning trigger to activate translation mechanisms that translate the blade assemblies in unison. While the dual device housing assembly is unfolded, two blade assemblies may be extended, either from sides opposite to a hinge of the dual device housing display or from adjacent sides, to increase the display area.

20 Claims, 13 Drawing Sheets

FOLDABLE COMMUNICATION DEVICE WITH TWO ROLLABLE DISPLAYS

BACKGROUND

1. Technical Field

The present disclosure relates generally to communication devices having a user interface device, and in particular to communication devices that have a translating display.

2. Description of the Related Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other. Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, clamshell and slider devices can tend to still be bulky.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
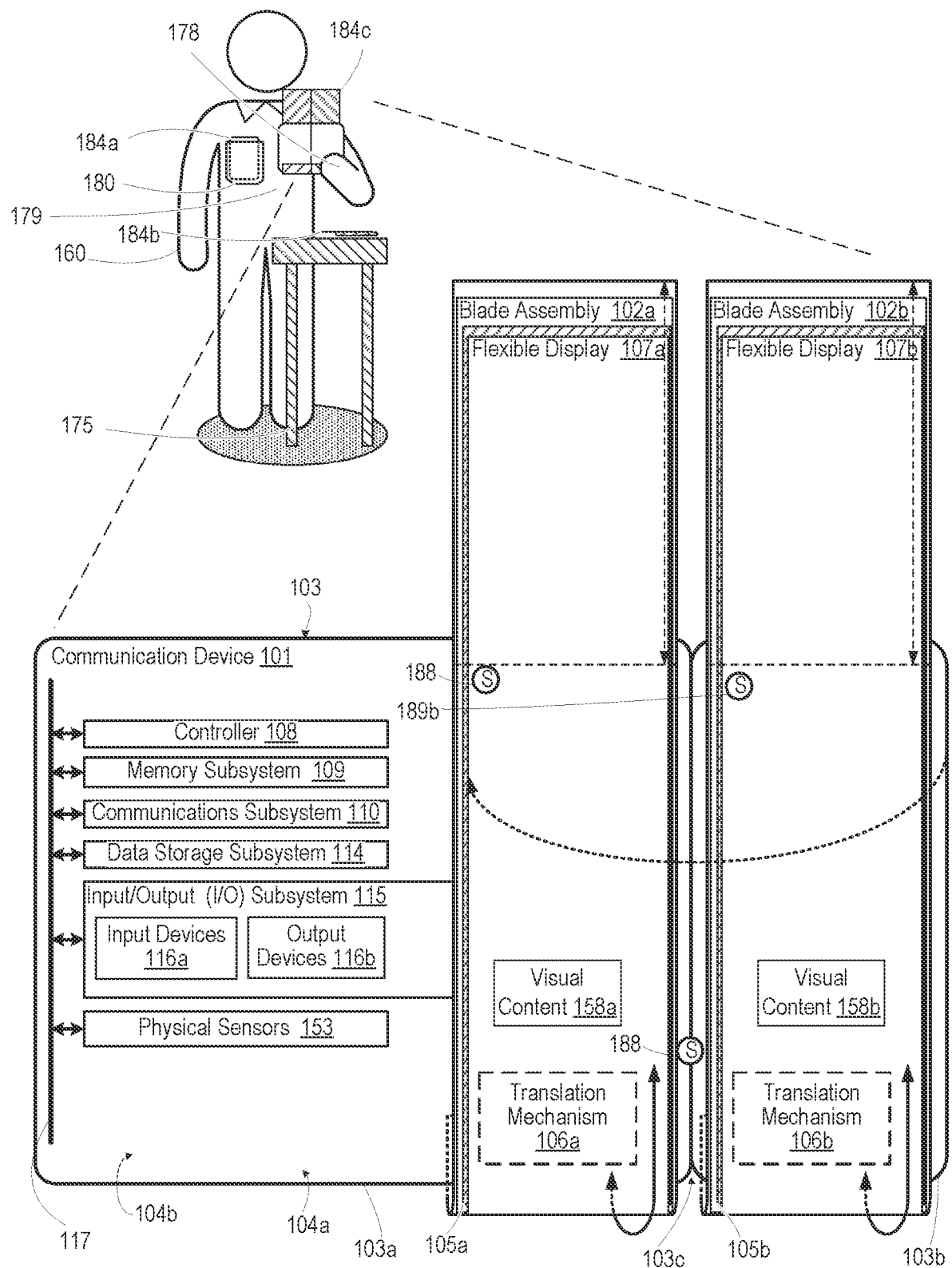
FIG. 1A depicts a simplified functional block diagram of a communication device having dual foldable housings that each support translating blade assemblies with flexible displays, according to one or more embodiments.

According to aspects of the present disclosure, an electronic device, a method, and a computer program product enable extending flexible displays to provide a display area that can be almost four times larger than a collapsed position (i.e., folded with retracted displays) of the electronic device for stowage. By supporting each flexible display in a blade assembly, the thickness of the foldable dual device housing assembly of the electronic device is not necessarily bulky. In one or more embodiments, the electronic device includes a hinge coupling a first housing to a second housing. The first housing is pivotable about the hinge relative to the second housing between a folded closed position and an unfolded open position. The electronic device includes a sensor configured to detect the device housing assembly in an unfolded open position. The electronic device includes a first blade assembly carrying a first blade and a first flexible display. The first blade assembly is slidably coupled to the first housing to translate from one of a first adjacent side, an opposite side and a second adjacent side to the hinge coupling. The electronic device includes a first translation mechanism operable to slide the first blade assembly relative to the first device housing between an extended position and a retracted position. The electronic device includes a second blade assembly carrying a second blade and a second flexible display. The second blade assembly is slidably coupled to the second device housing to translate from a corresponding one of a first adjacent side, an opposite side and a second adjacent side to the hinge coupling. The electronic device includes a second translation mechanism operable to slide the second blade assembly relative to the second device housing between an extended position and a retracted position. A controller of the electronic device is communicatively coupled to the first and the second translation mechanisms and the sensor. In response to determining, based on the sensor, that the device housing assembly is in the unfolded open position and in response to identifying an occurrence of at least one display positioning trigger, the controller actuates the first and the second translation mechanisms. The actuation respectively translates the first and the second blade assemblies in unison from a first position to a second position between the retracted position and the extended position.

The present disclosure thus provides a mobile device with a combined foldable housing and two rollable displays. An electronic device includes a combination of a foldable display and a set of two rollable displays that perform virtually as one display. The two rollable displays may extend in opposite directions from either side of the folding display. The rollable displays are not physically connected. The opposite extension may optimize landscape mode viewing. Alternatively, the extension may be in parallel, either upwardly or downwardly, and aligned with the hinge, optimizing portrait mode viewing. An optional retractable rail mechanism behind the flexible display holds the flexible display in alignment and prevents gaps, optimizing portrait mode viewing.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A is a simplified functional block diagram of an electronic device, which is referenced herein as communication device 101 and in which the features of the present disclosure are advantageously implemented. Communication device 101 is foldable with dual device housing assembly 103 including first and second housings 103a-103b that fold and unfold about hinge 103c. Communication device 101 is also a rollable display device, having first and second blade assemblies 102a-102b that respectively roll around one end of first and second housings 103a-103b, abutting corresponding front sides 104a and a portion of back sides 104b of first and second housings 103a-103b. Blade assemblies 102a-102b include respectively blades 105a-105b that are positioned by translation mechanisms 106a-106b. Blade assemblies 102a-102b include respectively flexible displays 107a-107b that are attached to move with blades 105a-105b. Communication device 101 includes controller 108, memory subsystem 109, communications subsystem 110, data storage subsystem 114, and input/output (I/O) subsystem 115. I/O subsystem 115 has input devices 116a, output devices 116b and I/O devices such as flexible displays 107a-107b. To enable management by controller 108, system interlink 117 communicatively connects controller 108 with memory subsystem 109, communications subsystem 110, data storage subsystem 114, and I/O subsystem 115.

Communication device 101 includes physical sensors 153 such as fold sensor 188. According to aspects of the present disclosure, controller 108, in response to determining, based on fold sensor 188, that device housing assembly 103 is in the unfolded open position and in response to identifying an occurrence of at least one display positioning trigger, actuates first and second translation mechanisms 106a-106b to translate respectively first and second blade assemblies 102a-102b in unison from a first position to a second position between the retracted position and the extended position. In one or more embodiments, at least one input device 116a is configured to detect a user input such as touch input, a gesture command, a verbal command, and gaze direction. Controller 108 monitors at least one input device 116a for detecting a user input associated with the display positioning trigger.

In one or more embodiments, controller 108 receives or generates visual content 158a-158b having a required display area. Controller 108 identifies the occurrence of the display positioning trigger based on determining that a first contiguous display area of first and second flexible displays 107a-107b aligned with front side 104a of device housing assembly 103 in the first position is less than the required display area. Controller 108 determines a required position of first and second blade assemblies 102a-102b that corresponds to the required display area. Controller 108 actuates first and second translation mechanisms 106a-106b to translate first and second blade assemblies 102a-102b in unison to the second position having the required display area.

In one or more embodiments, controller 108 determines a contiguous display area of first and second flexible displays 107a-107b aligned with front side 104a of device housing assembly 103 while first and second flexible displays 107a-107b are in one of the first and the second positions. Controller 108 receives or generates visual content 158a-158b. Controller 108 presents visual content 158a-158b on the contiguous display area of first and second flexible displays 107a-107b while first and second flexible displays 107a-107b are in the corresponding one of the first and the second positions.

In one or more embodiments, controller 108 automatically responds to contexts determined based at least in part on physical sensors 153 by positioning blade assemblies 102a-102b of communication device 101 in retracted configuration 184a stowed next to body 179 of user 160 in pocket 180, in partially extended peek configuration 184b when stationary on a surface such as table 175, when visual content 158a-158b is received or generated, or in extended configuration 184c in hand 178 when a larger display output is required. Physical sensors 153 also detect a physical form factor of communication device 101, such as fold sensor 188 that detects whether device housing assembly 103 is folded or unfolded. Physical sensors 153 also may include display position sensors 189a-189b that detect respective positions of flexible displays 107a-107b.

Figure 1B:
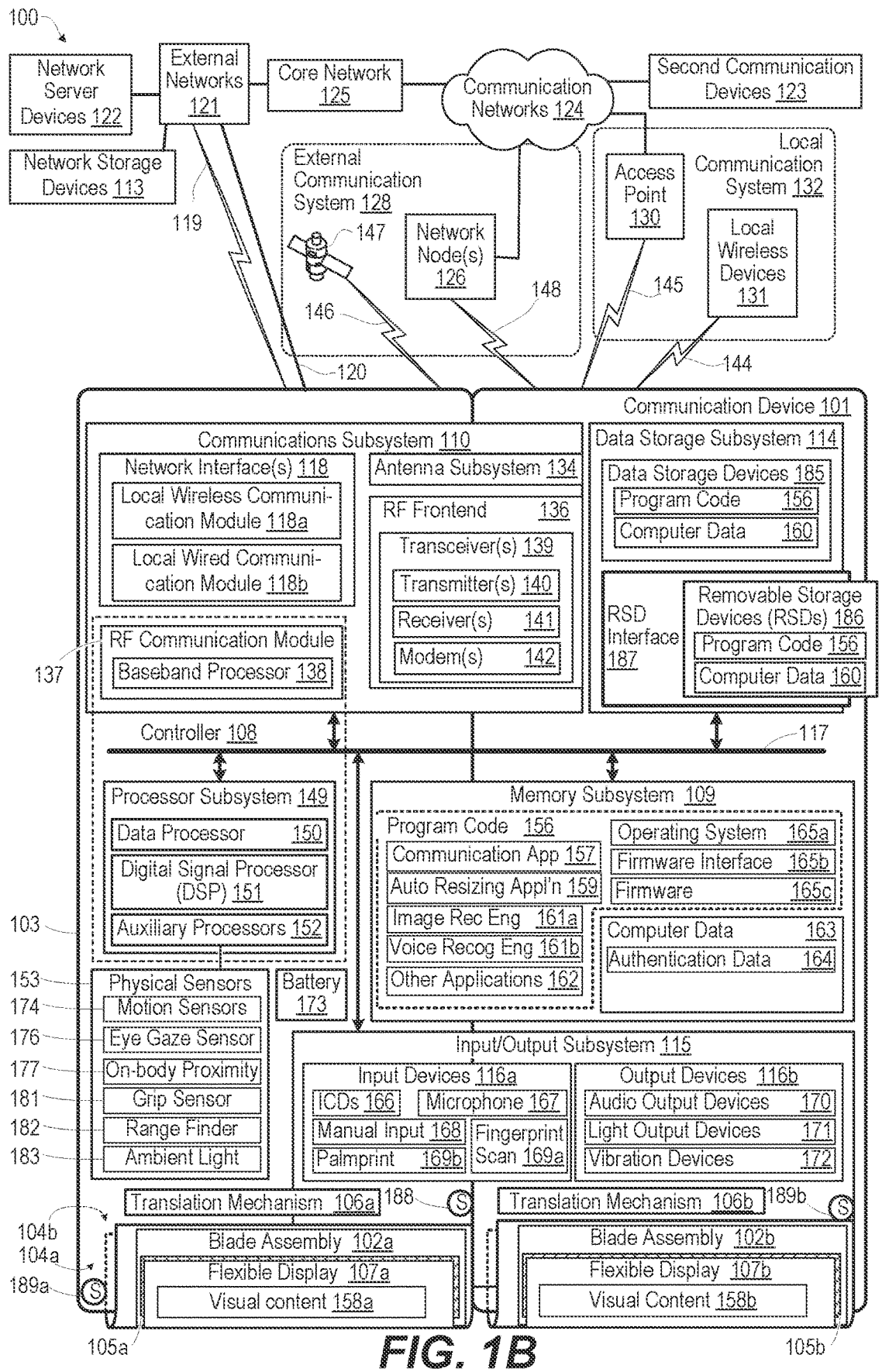
FIG. 1B depicts a functional block diagram of a communication environment including the communication device having dual foldable housings that each support translating blade assemblies with flexible displays, according to one or more embodiments.

FIG. 1B is a functional block diagram of a communication environment 100 that includes communication device 101 and in which the features of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to the above introduced components, communication device 101 includes system interlink 117. System interlink 117 includes internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 117) are illustrated in FIGS. 1A and 1B, it is to be understood that more, fewer, or different interconnections may be present in other embodiments.

In one or more embodiments, communications subsystem 110 may include one or more network interfaces 118, such as local wireless communication module 118a and local wired communication module 118b, to communicatively couple communication device 101 respectively via wireless connection 119 or network cable 120 to external networks 121. Communication device 101, via external networks 121, may connect to network storage devices 113 that store computer data and to network server devices 122 that facilitate access to network storage devices 113. Network server devices 122 may have identical or similar components and functionality as described above for communication device 101. Communication device 101 may communicate with second communication devices 123 via external networks 121 or via communication networks 124 that are supported by core networks 125. Network interface(s) 118 may include a network interface controller (NIC) and support one or more network communication protocols. External networks 121 can include a local area network (LAN), a campus area network (CAN), a metropolitan area network (MAN), or a wide area network (WAN). For example, wireless connection 119 and network cable 120 can be an Ethernet connection/cable.

In one or more embodiments, communications subsystem 110 may include additional functionality for communicating, using a cellular connection, with network node(s) 126 of external communication system 128 and for communicating, using a wireless connection, with wireless access point 130 or local wireless devices 131 of local communication system 132. Communications subsystem 110 includes antenna subsystem 134. Communications subsystem 110 includes radio frequency (RF) front end 136 and RF communication module 137 having baseband processor 138. RF front end 136 includes transceiver(s) 139, which includes transmitter(s) 140 and receiver(s) 141. RF front end 136 further includes modem(s) 142. Baseband processor 138 of RF communication module 137 communicates with controller 108 and RF front end 136. Baseband processor 138 operates in a baseband frequency range to encode data for transmission and decode received data, according to a communication protocol. Modem(s) 142 modulates baseband encoded data from RF communication module 137 onto a carrier signal to provide a transmit signal that is amplified by transmitter(s) 140. Modem(s) 142 demodulates each signal received using antenna subsystem 134 from external communication system 128 or local communication system 132. The received signal is amplified and filtered by receiver(s) 141, which demodulates received encoded data from a received carrier signal.

In one or more embodiments, controller 108, via communications subsystem 110, performs multiple types of cellular over-the-air (OTA) or wireless communication with local communication system 132. Communications subsystem 110 can communicate via an OTA connection 144 with local wireless devices 131. In an example, OTA connection 144 is a Bluetooth connection, or other personal access network (PAN) connection. In one or more embodiments, communications subsystem 110 communicates with one or more locally networked devices via a wireless local area network (WLAN) link 145 supported by access point 130. In one or more embodiments, access point 130 supports communication using one or more IEEE 402.11 WLAN protocols. Access point 130 is connected to communication networks 124 via a cellular or wired connection. In one or more embodiments, communications subsystem 110 receives downlink channels 146 from GPS satellites 147 to obtain geospatial location information. Communications subsystem 110 can communicate via an over-the-air (OTA) cellular connection 148 with network node(s) 126.

Controller 108 includes processor subsystem 149, which includes one or more central processing units (CPUs), depicted as data processor 150. Processor subsystem 149 can include one or more digital signal processors 151 that can be integrated with data processor 150. Processor subsystem 149 can include other processors that are communicatively coupled to data processor 150, such as baseband processors 138 of communication module 137. In another example, auxiliary processors 152 may act as a low power consumption, always-on sensor hub for physical sensors 153. In one or more embodiments that are not depicted, controller 108 can further include distributed processing and control components that are external to device housing assembly 103 or grouped with other components, such as I/O subsystem 115. Data processor 150 is communicatively coupled, via system interlink 117, to memory subsystem 109. In one or more embodiments, data processor 150 is communicatively coupled via system interlink 117 to communications subsystem 110, data storage subsystem 114 and I/O subsystem 115. Controller 108 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 109 stores program code 156 for execution by processor subsystem 149 to provide the functionality described herein. Program code 156 includes applications, such as communication application 157, which receive or generate visual content 158a-158b that may be presented on both flexible displays 107a-107b respectively. Program code includes applications, including auto resizing application 159, which determines a heuristic context of communication device 101 and user 160 for controlling translation mechanisms 106a-106b that respectively position blade assembly 102a-102b. Program code may include applications or utilities, such as image recognition engine 161a, voice recognition engine 161b, and other applications 162. In one or more embodiments, several of the described aspects of the present disclosure are provided via executable program code of applications executed by controller 108. In one or more embodiments, program code 156 may be integrated into a distinct chipset or hardware module as firmware that operates separately from executable program code. Portions of program code 156 may be incorporated into different hardware components that operate in a distributed or collaborative manner. Implementation of program code 156 may use any known mechanism or process for doing so using integrated hardware and/or software, as known by those skilled in the art. Program code 156 may access, use, generate, modify, store, or communicate computer data 163, such as authentication data 164.

Computer data 163 may incorporate "data" that originated as raw, real-world "analog" information that consists of basic facts and figures. Computer data 163 includes different forms of data, such as numerical data, images, coding, notes, and financial data. The computer data may originate at communication device 101 or be retrieved by communication device 101. Communication device 101 may store, modify, present, or transmit computer data 163. Computer data 163 may be organized in one of a number of different data structures. Common examples of computer data 163 include video, graphics, text, and images as discussed herein. Computer data 163 can also be in other forms of flat files, databases, and other data structures.

Memory subsystem 109 further includes operating system (OS) 165a, firmware interface 165b, such as basic input/output system (BIOS) or Uniform Extensible Firmware Interface (UEFI), and firmware 165c, which may be considered to be program code 156.

I/O subsystem 115 includes input devices 116a, output devices 116b, and I/O devices such as flexible displays 107a-107b. Blade assembly 102 includes blade 105 which supports flexible display 107. Input devices 116a may include image capturing devices (ICDs) 166, microphone 167, manual input devices 168 (e.g., keys and buttons), fingerprint scanning device 169a, and palmprint scanning device 169b. Output devices 116b may include audio output devices 170, light output devices 171, and vibration device 172. Vibration device 172 oscillates a mass such as battery 173 to create vibratory alerts.

Physical sensors 153 provides additional contextual indications of the use and environment of communication device 101. Examples of physical sensors 153 include motion sensors 174 or motion detectors such as accelerometers that detect when communication device 101 is being moved by user 160 or stationary on a surface such as table 175. Physical sensors 153 may include eye gaze sensor 176 that detect whether user 160 is looking toward communication device 101. Physical sensors 153 may include on-body proximity sensors 177 that detect proximity to a lossy dielectric mass (i.e., hand 178 or body 179 of user 160) such as when placed in pocket 180. Physical sensors 153 may include grip sensors 181 exteriorly presented on device housing assembly 103 and detecting when communication device 101 is being held in hand 178 of user 160. Physical sensors 153 may include range finder 182 and ambient light sensor 183.

Data storage subsystem 114 of communication device 101 includes data storage device(s) 185. Controller 108 is communicatively connected, via system interlink 117, to data storage device(s) 185. Data storage subsystem 114 provides program code 156 and computer data 163 stored on non-volatile storage that is accessible by controller 108. For example, data storage subsystem 114 can provide a selection of program code 156 and computer data 163. These applications can be loaded into memory subsystem 109 for execution/processing by controller 108. In one or more embodiments, data storage device(s) 185 can include hard disk drives (HDDs), optical disk drives, and/or solid-state drives (SSDs), etc. Data storage subsystem 114 of communication device 101 can include removable storage device(s) (RSD(s)) 186, which is received in RSD interface 187. Controller 108 is communicatively connected to RSD 186, via system interlink 117 and RSD interface 187. In one or more embodiments, RSD 186 is a non-transitory computer program product or computer readable storage device. Controller 108 can access data storage device(s) 185 or RSD 186 to provision communication device 101 with program code, such as program code 156.

Figure 2A:
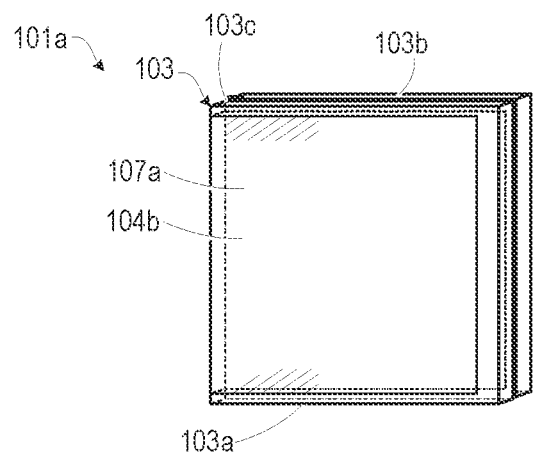
FIG. 2A depicts a front view of an example communication device with a dual device housing assembly in a folded closed position, according to one or more embodiments.

FIG. 2A depicts a front view of communication device 101a with dual device housing assembly 103 in a folded closed position. First and second housings 103a-103b are pivoted about hinge 103c, bringing front sides 104a of first and second housings 103a-103b together. Blade assemblies 102a-102b (FIG. 1A) are in the retracted position. A portion of first flexible display 107a retracted onto back side 104b of first housing 103a is exposed. Similarly, a portion of second flexible display 107b retracted onto back side 104b of second housing 103b (FIG. 1A) is exposed.

Figure 2B:
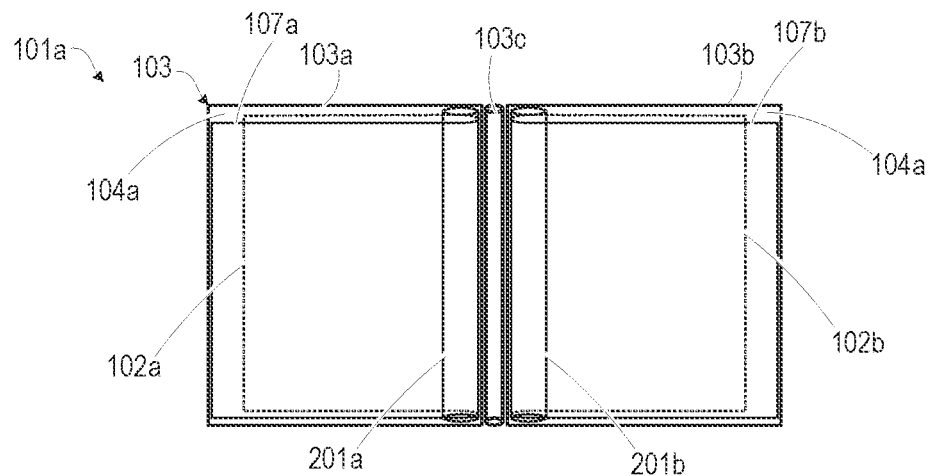
FIG. 2B depicts a front view of the example communication device of FIG. 2A with the dual device housing assembly in an unfolded open position and with translation rollers, which are parallel and proximate to a hinge, having positioned blade assemblies in retracted positions, according to one or more embodiments.

FIG. 2B depicts a front view of example communication device 101a with dual device housing assembly 103 in the unfolded open position exposing front sides 104a of first and second housings 103a-103b. First and second translation rollers 201a-201b of first and second translation mechanisms 106a-106b, respectively, are parallel and proximate to hinge 103c. First and second blade assemblies 102a-102b are in retracted positions. First and second blade assemblies 102a-102b respectively roll around one end of first and second housings 103a-103b proximate to and aligned with hinge 103c, abutting corresponding front sides 104a and a portion of back sides 104b of first and second housings 103a-103b.

Figure 2C:
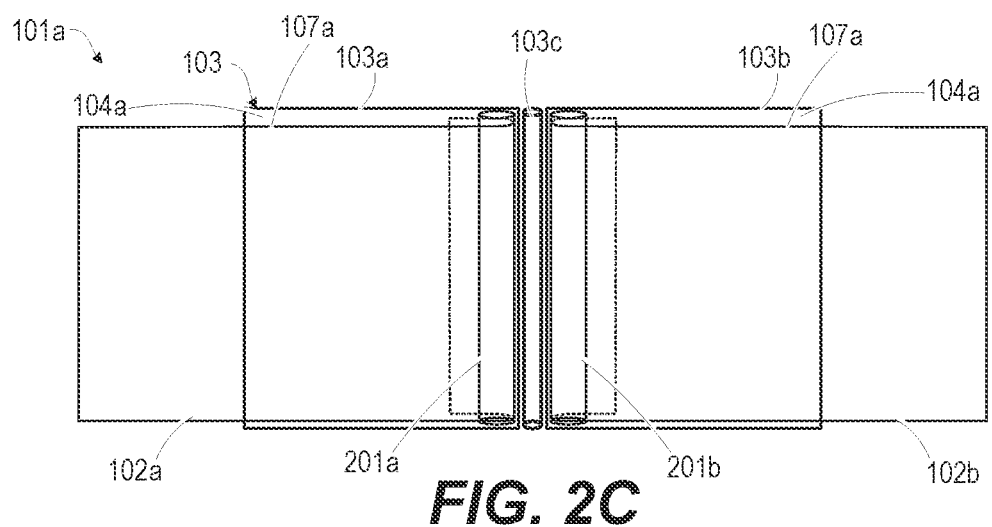
FIG. 2C depicts a front view of the example communication device of FIG. 2A with the dual device housing assembly in the unfolded open position and with the translation rollers positioning blade assemblies in opposing extended positions, according to one or more embodiments.

FIG. 2C depicts a front view of the example communication device 101a with dual device housing assembly 103 in the unfolded open position and with translation rollers 201a-201b respectively positioning blade assemblies 102a-102b in opposing extended positions. Flexible displays 107a-107b extend beyond respective edges of first and second housings 103a-103b that are opposite to hinge 103c.

Figure 3A:
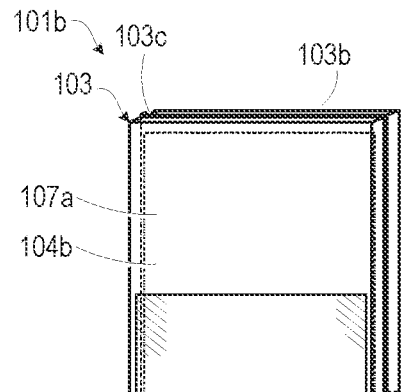
FIG. 3A depicts a front view of another example communication device with a dual device housing assembly in a folded closed position, according to one or more embodiments.

FIG. 3A depicts a front view of another example communication device 101b with dual device housing assembly 103 in a folded closed position. First and second housings 103a-103b are pivoted about hinge 103c, bringing front sides 104a of first and second housings 103a-103b together. Blade assemblies 102a-102b (FIG. 1A) are in the retracted position. A portion of first flexible display 107a retracted onto back side 104b of first housing 103a is exposed. Similarly, a portion of second flexible display 107b retracted onto back side 104b of second housing 103b (FIG. 1A) is exposed.

Figure 3B:
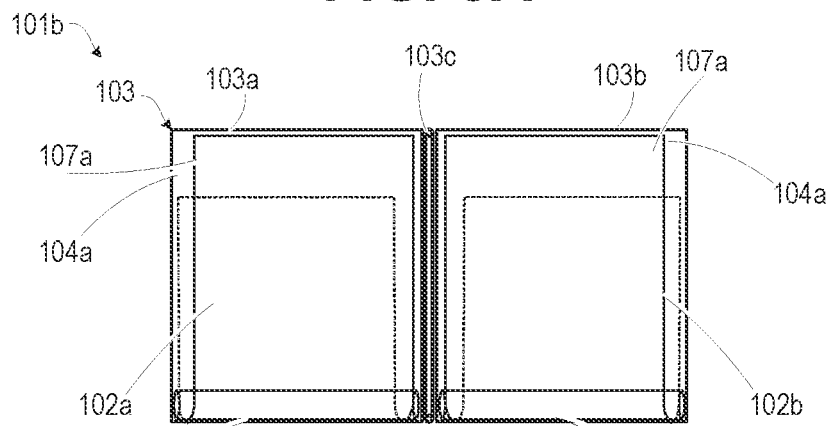
FIG. 3B depicts a front view of the example communication device of FIG. 3A with the dual device housing assembly in an unfolded open position and with aligned translation rollers, which are orthogonal to a hinge, positioning blade assemblies in retracted positions, according to one or more embodiments.

FIG. 3B depicts a front view of the example communication device of FIG. 3A with the dual device housing assembly in an unfolded open position and with aligned translation rollers, which are orthogonal to a hinge, positioning blade assemblies in retracted positions. First and second translation rollers 301a-301b of first and second translation mechanisms 106a-106b, respectively, are aligned and are orthogonal to hinge 103c on corresponding adjacent sides of first and second housings 103a-103b. First and second blade assemblies 102a-102b are in parallel retracted positions. First and second blade assemblies 102a-102b respectively roll around aligned adjacent end of first and second housings 103a-103b, abutting corresponding front sides 104a and a portion of back sides 104b of first and second housings 103a-103b.

Figure 3C:
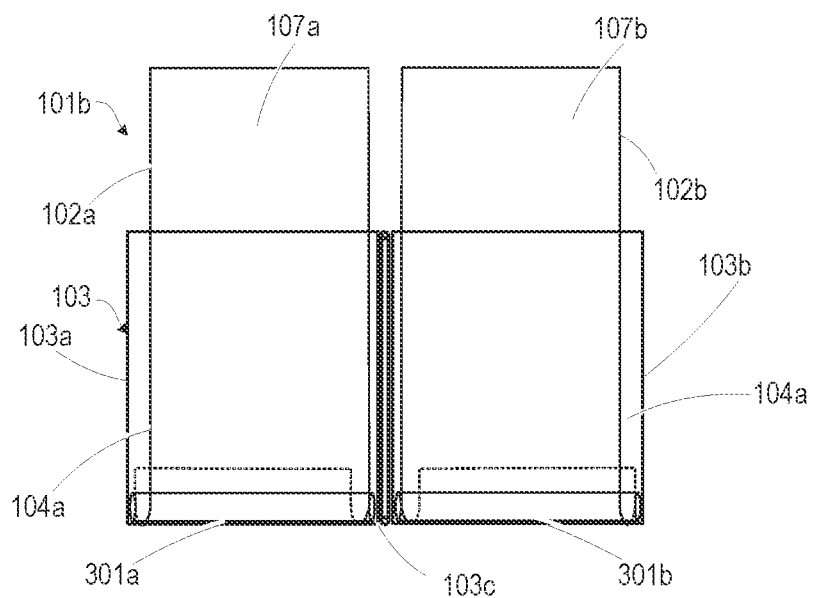
FIG. 3C depicts a front view of the example communication device of FIG. 3A with the dual device housing assembly in the unfolded open position and with the translation rollers positioning blade assemblies in aligned extended positions, according to one or more embodiments.

FIG. 3C depicts a front view of example communication device 101b with dual device housing assembly 103 in the unfolded open position and with translation rollers 301a-301b respectively positioning blade assemblies 102a-102b in parallel extended positions. Flexible displays 107a-107b extend beyond aligned second adjacent edges of first and second housings 103a-103b.

Figure 4A:
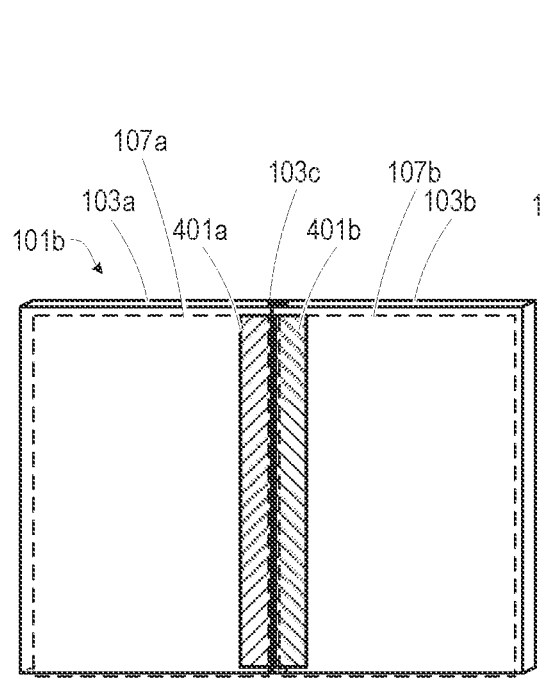
FIG. 4A depicts a front view of one version of communication device of FIG. 3A having narrow extendable rail mechanisms in retracted positions and which respectively position the flexible displays in close alignment proximate to the hinge, according to one or more embodiments.

FIG. 4A depicts a front view of one version of communication device 101b having first and second narrow extendable rail mechanisms 401a-401b in retracted positions, which are coupled respectively to first and second housings 103a-103b for sliding translation proximate to and in parallel to hinge 103c. First and second narrow extendable rail mechanisms 401a-401b respectively position corresponding first and second flexible displays 107a-107b in close alignment proximate to the hinge 103c.

Figure 4B:
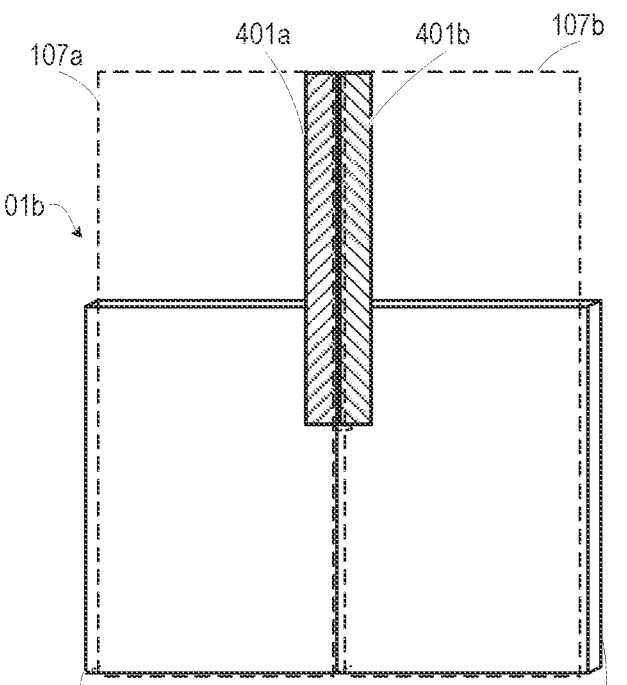
FIG. 4B depicts a front view of the one version of communication device of FIG. 4A having the narrow extendable rail mechanisms in extended positions to position the flexible displays in close alignment while extended, according to one or more embodiments.

FIG. 4B depicts a front view of the one version of communication device 101b having first and second narrow extendable rail mechanisms 401a-401b in extended positions, and which are coupled respectively to first and second housings 103a-103b for sliding translation proximate to and in parallel to hinge 103c. First and second narrow extendable rail mechanisms 401a-401b respectively position corresponding first and second flexible displays 107a-107b in close alignment proximate to the hinge 103c while the first and second flexible displays 107a-107b are also in the extended position.

Figure 5A:
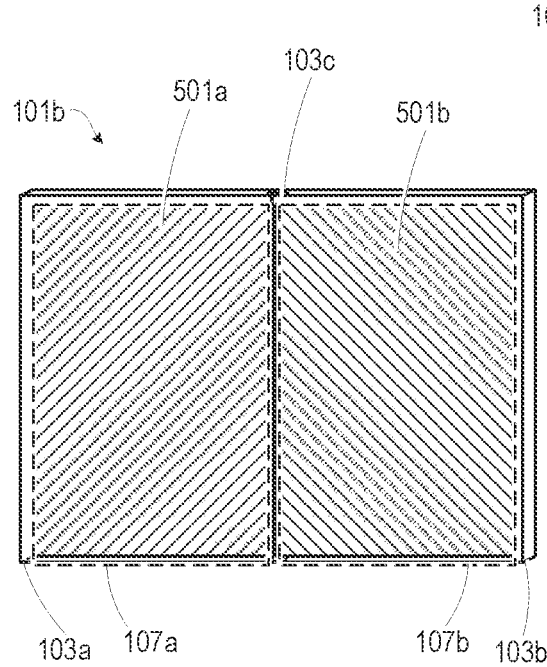
FIG. 5A depicts a front view of another version of communication device of FIG. 3A having full width extendable rail mechanisms in retracted positions and that respectively position the flexible displays in close alignment proximate to the hinge, according to one or more embodiments.

FIG. 5A depicts a front view of another version of communication device 101b having first and second full width extendable rail mechanisms 501a-501b in retracted positions, which are coupled respectively to first and second housings 103a-103b for sliding translation proximate to and in parallel to hinge 103c. First and second full width extendable rail mechanisms 501a-501b respectively position corresponding first and second flexible displays 107a-107b in close alignment proximate to the hinge 103c.

Figure 5B:
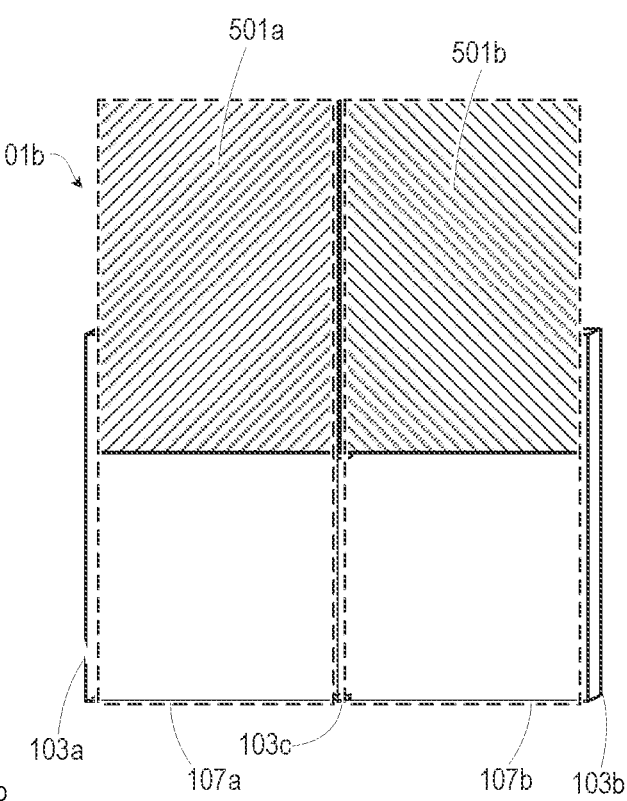
FIG. 5B depicts a front view of the other version of communication device of FIG. 5A having the full-width extendable rail mechanisms in extended positions to position the flexible displays in close alignment while extended, according to one or more embodiments.

FIG. 5B depicts a front view of another version of communication device 101b having first and second full width extendable rail mechanisms 501a-501b in extended positions, and which are coupled respectively to first and second housings 103a-103b for sliding translation proximate to and in parallel to hinge 103c. First and second full width extendable rail mechanisms 501a-501b respectively position corresponding first and second flexible displays 107a-107b in close alignment proximate to the hinge 103c while first and second flexible displays 107a-107b are also in the extended position.

Figure 6A:
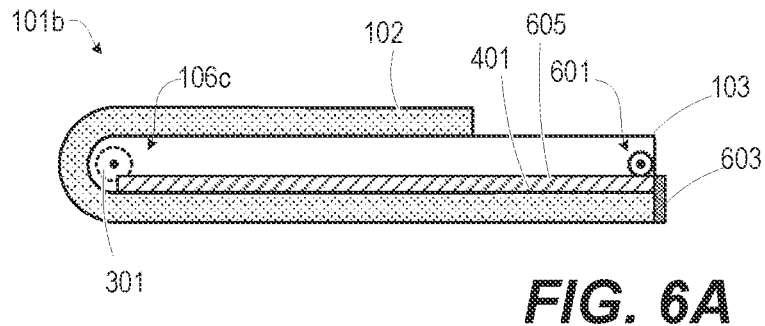
FIG. 6A depicts a side view of an example translation mechanism engaged to a blade assembly of the communication device of either FIG. 4A or 5A with a passive gear mechanism guiding the extendable rail mechanism that is in the retracted position, according to one or more embodiments.
Figure 6B:
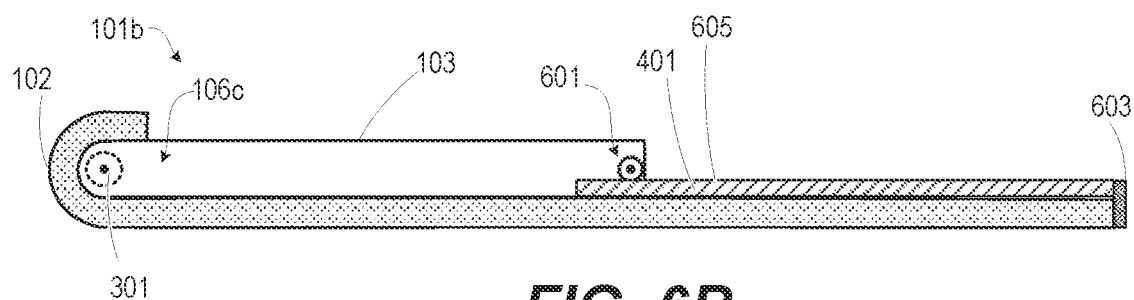
FIG. 6B depicts a side view of the example translation mechanism of FIG. 6A engaged to the blade assembly with the passive gear mechanism guiding the extendable rail mechanism that is in the extended position, according to one or more embodiments.

For clarity, FIGS. 6A-6B, 7A-7B and 8-14 described below generally omit the reference numeral suffix of either "a" or "b", which have been used within the figures herein to indicate first and second or left and right. In an example, a description of "blade assembly 102" would apply to either blade assembly 102a or blade assembly 102b. FIG. 6A depicts a side view of example translation mechanism 106c engaged to blade assembly 102 of communication device 101b. Translation mechanism 106c includes passive gear mechanism 601 guiding extendable rail mechanism 401 that is in the retracted position. Alternatively, full-width rail mechanism 501a-501b may be implemented. Translation roller 301 is controlled by an electric motor and engages and translates blade assembly 102. Passive rail mechanism 601 is distally attached to a distal end of blade assembly 102 by hook 603. Hook 603 moves passive rail mechanism 601 with blade assembly 102. Passive rail mechanism 601 presents a toothed surface 605 to passive gear mechanism 601 that holds extendable rail mechanism 401 and blade assembly 102 in alignment. FIG. 6B depicts a side view of example translation mechanism 106c engaged to blade assembly 102 of communication device 101b. Translation mechanism 106c includes passive gear mechanism 601 guiding extendable rail mechanism 401 that is in the extended position.

Figure 7A:
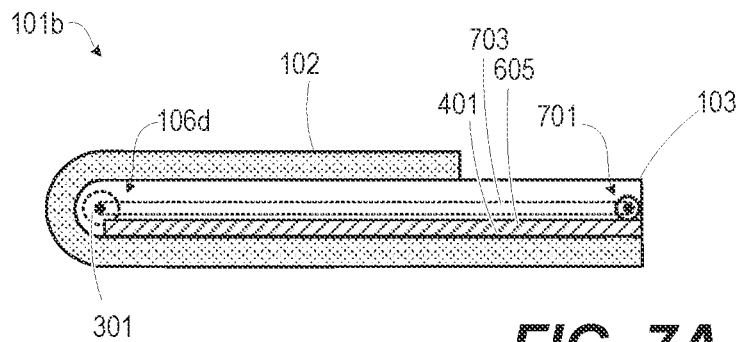
FIG. 7A depicts a side view of an example translation mechanism engaged to a blade assembly of the communication device of either FIG. 4A or 5A with an active gear mechanism guiding the extendable rail mechanism that is in the retracted position, according to one or more embodiments.
Figure 7B:
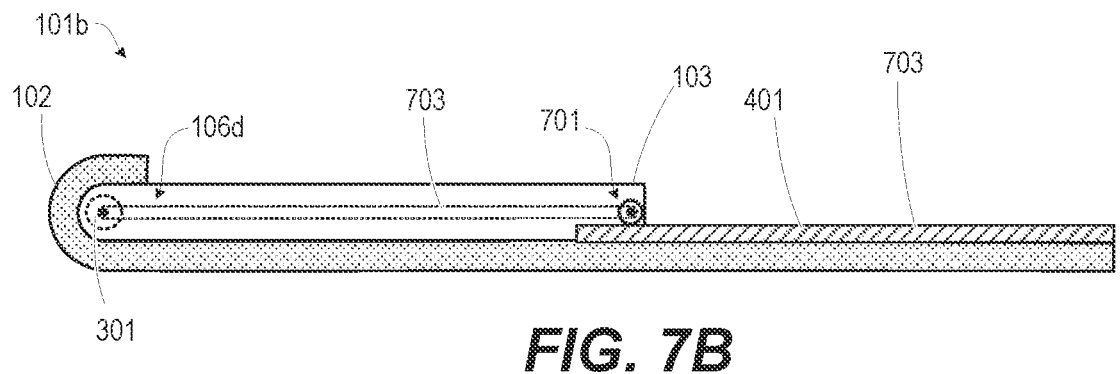
FIG. 7B depicts a side view of the example translation mechanism of FIG. 7A engaged to the blade assembly with the active gear mechanism guiding the extendable rail mechanism that is in the extended position, according to one or more embodiments.

FIG. 7A depicts a side view of example translation mechanism 106d engaged to blade assembly 102 of communication device 101b. Translation mechanism 106d includes active gear mechanism 701 guiding extendable rail mechanism 401 that is in the retracted position. Alternatively, full-width rail mechanism 501a-501b may be implemented. Translation roller 301 is controlled by an electric motor and engages and translates blade assembly 102. Transmission mechanism 703, such a drive belt between translation roller 301, also turns active roller mechanism 701. Extendable rail mechanism 401 is attached to blade assembly 102 to move in unison. Extendable rail mechanism 401 presents a toothed surface 605 to active gear mechanism 601 that holds extendable rail mechanism 401 and blade assembly 102 in alignment. FIG. 7B depicts a side view of example translation mechanism 106c engaged to blade assembly 102 of communication device 101b. Translation mechanism 106c includes passive gear mechanism 601 guiding extendable rail mechanism 401 that is in the extended position.

Figure 8:
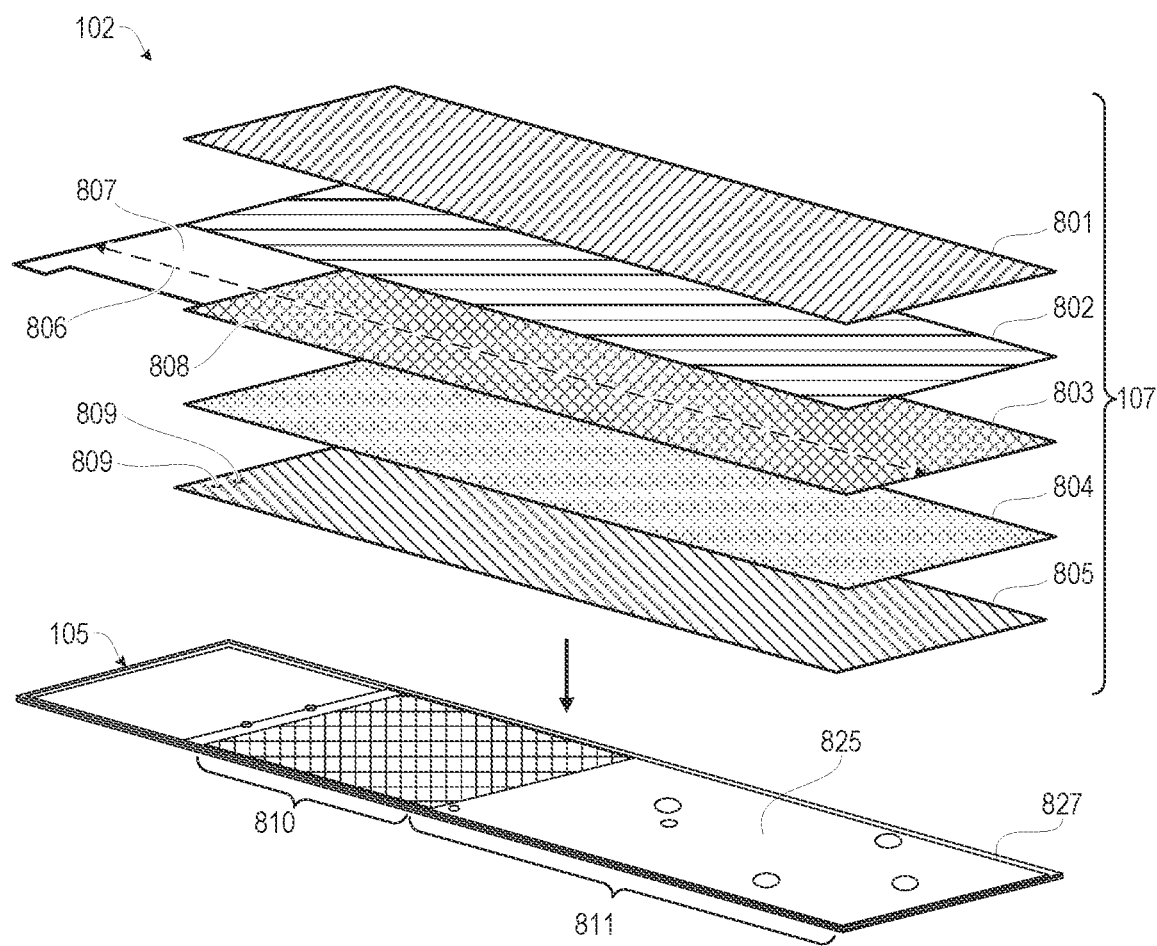
FIG. 8 depicts a blade assembly with a blade and with a flexible display in an exploded view, according to one or more embodiments.

FIG. 8 illustrates blade assembly 102 with blade 105 and with flexible display 107 in an exploded view. In one or more embodiments, flexible display 107 includes one or more layers that are coupled or laminated together to complete flexible display 107. In an example, flexible display 107 includes flexible protective cover 801, first adhesive layer 802, flexible display layer 803, second adhesive layer 804, and flexible substrate 805. Beginning from the top of the layer stack opposite to blade 105, in one or more embodiments, flexible protective cover 801 includes an optically transparent substrate such as a thin film sheet of a thermoplastic material. In an example, flexible protective cover 801 is manufactured from a layer of optically transparent polyamide or polycarbonate having a thickness of about eighty microns. Flexible protective cover 801 may function as a fascia by defining a cover for flexible display layer 803. In one or more embodiments, flexible protective cover 801 is optically transparent, in that light can pass through the flexible protective cover 801 so that objects behind flexible protective cover 801 can be distinctly seen. Flexible protective cover 801 may optionally include an ultra-violet barrier. Such a barrier can be useful in improving the visibility of flexible display layer 803.

Beneath flexible protective cover 801 is first adhesive layer 802. In one or more embodiments, first adhesive layer 802 is an optically transparent adhesive. The optically transparent adhesive can be applied to two sides of a thin, optically transparent substrate such that the first adhesive layer 802 functions as an optically transparent layer having optically transparent adhesive on both sides. Where so configured as "double-sided tape", first adhesive layer 802 may have a thickness of about fifty microns that can then be spooled and applied between, to couple together, flexible protective cover 801 and flexible display layer 803. In other embodiments, first adhesive layer 802 may be applied between flexible protective cover 801 and the display layer 803 as an optically transparent liquid or gel that is allowed to cure or optionally cured by heat, ultraviolet light, or other techniques. First adhesive layer 802 mechanically couples flexible display layer 803 to flexible protective cover 801.

In one or more embodiments, flexible display layer 803 is situated between flexible substrate 805 and flexible protective cover 801. Flexible display layer 803 includes image producing portion 807 having a same length and width, and aligned with, of flexible protective cover 801 and flexible substrate 805. In one or more embodiments, flexible display layer 803 includes T-shaped tongue 808 is attached along major axis 806 of flexible display layer 803. Blade 105 is sized to receive flexible display layer 803 attached to T-shaped tongue 808. In one or more embodiments, electronic circuit components configured to operate image producing portion 807 of the flexible display layer 803, connectors, and other components can be coupled to this T-shaped tongue 808 and further coupled to image producing portion 807 of flexible display 107. For instance, as shown in FIG. 8 the flexible display layer 803 includes a T-shaped tongue 808 that extends beyond the image producing portion 807 of the flexible display layer 803 and other layers (401, 802, 804, and 805) of flexible display 107. While the T-shaped tongue 808 is T-shaped in this illustrative embodiment, T-shaped tongue 808 can take other shapes.

Flexible display layer 803 optionally may be touch-sensitive. In one or more embodiments, flexible display layer 803 is an organic light emitting diode (OLED) display layer. When coupled to flexible substrate 805, flexible display layer 803 can bend in accordance with various bending radii. For example, some embodiments allow bending radii of between thirty and six hundred millimeters. Other substrates allow bending radii of around five millimeters to provide a display that is foldable through active bending. Other configurations of flexible display 107 may accommodate both bends and folds. In one or more embodiments, flexible display layer 803 may be formed from multiple layers of flexible material such as flexible sheets of polymer or other materials. Flexible display layer 803 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 803 has a thickness of about 130 microns.

In one or more embodiments, to be touch sensitive, flexible display layer 803 includes a layer including one or more optically transparent electrodes. In one or more embodiments, flexible display layer 803 includes an organic light emitting diode layer configured to present images and other information to user 160 (FIG. 1A). The organic light emitting diode layer can include one or more pixel structures arranged in an array, with each pixel structure including a plurality of electroluminescent elements such as organic light emitting diodes. These various layers can be coupled to one or more optically transparent substrates of flexible display layer 803. In one or more embodiments, flexible substrate 805 includes a thin layer of steel having a thickness of about thirty microns. In one or more embodiments, flexible substrate 805 includes a thin layer of thermoplastic material.

In one or more embodiments, flexible display layer 803 is coupled to flexible substrate 805 by second adhesive layer 804. In one or more embodiments, second adhesive layer 804 is identical to the first adhesive layer 802 and includes an optically transparent adhesive. However, since second adhesive layer 804 is coupled between flexible display layer 803 and the flexible substrate 805, i.e., under the flexible display layer 803, an optically transparent adhesive is not a requirement. Second adhesive layer 804 may be partially optically transparent or not optically transparent. Regardless of whether second adhesive layer 804 is optically transparent, in one or more embodiments, adhesive of the second adhesive layer 804 is applied to two sides of a thin, flexible substrate. Where so configured, in one or more embodiments, second adhesive layer 804 has a thickness of about fifty microns. This extremely thin version of "double-sided tape" can then be spooled and applied between flexible display layer 803 and flexible substrate 805. In other embodiments, as with first adhesive layer 802, second adhesive layer 804 may instead be applied between flexible display layer 803 and flexible substrate as a liquid or gel that is passively cured or that is actively cured by heat, ultraviolet light, or other techniques.

In other embodiments, a layer (401-802) above flexible display layer 803 may be configured with enough stiffness to make the flexible substrate 805 unnecessary. In an example, flexible protective cover 801 is configured with enough stiffness to provide sufficient protection for flexible display 107 during bending, enabling flexible substrate 805 to be omitted.

Flexible display 107 is supported by flexible substrate 805 and by blade 105 having blade substrate 825. In one or more embodiments, blade substrate 825 includes a layer of steel.

In one or more embodiments, blade substrate 825 is thicker than flexible substrate 805. In an example, flexible substrate 805 includes a steel layer with a thickness of about thirty microns and blade substrate 825 includes a layer of steel having a thickness of about one hundred microns. In one or more embodiments, blade substrate 825 is a rigid, substantially planar support layer. In an example, blade substrate 825 may be manufactured from stainless steel, from a thin, rigid thermoplastic sheet, or from nitinol material, which is a nickel-titanium alloy.

In one or more embodiments, the flexible substrate 805 is slightly longer along a major axis of the flexible substrate 805 than is the image producing portion 807 of the flexible display 107. Since the T-shaped tongue 808 is T-shaped, this allows one or more apertures 809 to be exposed on either side of the base of the T of the T-shaped tongue 808. As will be described in more detail below, this extra length along the major axis provided by the flexible substrate 805 allows one or more fasteners to rigidly couple the first end of the flexible substrate 805 to a tensioner.

Embodiments of the disclosure contemplate that some of the layers comprising the flexible display 107 are stiffer than others. Similarly, other layers of the flexible display 107 are softer than others. For example, where the flexible substrate 805 is manufactured from a metal, one example of which is stainless steel, this layer is stiffer than either the first adhesive layer 802 or the second adhesive layer 804. In one or more embodiments, the stainless steel is stiffer than the flexible display layer 803 as well. In one or more embodiments, the flexible substrate 805 is the stiffest layer in the flexible display 107 while the first adhesive layer and the second adhesive layer 804 are the softest layers of the flexible display 107. The flexible protective cover 801 and the flexible display layer 803 have a stiffness that falls between that of the flexible substrate 805 and the adhesive layers in one or more embodiments.

In one or more embodiments, the various layers of the flexible display 107 are laminated together in a substantially planar configuration. Said differently, in one or more embodiments the flexible substrate 805 is configured as a substantially planar substrate. The second adhesive layer 804 can be attached to this substantially planar substrate, with the flexible display layer 803 then attached to the second adhesive layer 804. The first adhesive layer 802 can be attached to the flexible display layer 803, with the flexible protective cover 801 attached to the first adhesive layer 802. To ensure proper coupling, flexible display layer 803 can be cured, such as in an autoclave at a predefined temperature for a predefined duration. Where employed, such curing allows any air bubbles or other imperfections in the various layers to be corrected. In one or more embodiments, flexible substrate 805 is configured as a substantially planar substrate resulting in flexible display 107 being substantially planar.

In one or more embodiments, blade substrate 825 of blade 105 includes both flexible portion 810 and rigid portion 811. Flexible portion 810 is positioned to encounter bending in translation of blade assembly 102 from the retracted position to the extended position. Rigid portion 811 is positioned to remain on front side 104a of device housing assembly 103 (FIG. 1A) during translation. In the extended position, rigid portion 811 extends beyond front side 104a of device housing assembly 103 (FIGS. 3A-3B). In an example, blade substrate 825 is manufactured from a metal such as steel having a thickness of one hundred microns that provides rigidity to rigid portion 811.

In one or more embodiments, blade 105 includes silicone border 827 positioned around a perimeter of blade substrate

825 to protect the edges of flexible display 107 when attached to blade substrate 825 of blade105. In one or more embodiments, silicone border 827 is co-molded around the perimeter of blade substrate 825.

In one or more embodiments, rigid portion 811 of blade substrate 825 can define one or more apertures. These apertures can be used for a variety of purposes. In an example, some of the apertures can be used to rigidly fasten blade 105 to one of translation mechanisms 106*a*-106*b* (FIG. 1A), such as a display roller mechanism. Additionally, some of the apertures can contain magnets. Hall-effect sensors positioned in device housing assembly 103 (FIG. 1A) to which blade assembly 102 is coupled can then detect the positions of these magnets such that controller 108 (FIG. 1A) can determine whether blade assembly 102 including flexible display 107 are in the extended position, the retracted position, the peek position, or an intermediate position.

In one or more embodiments, flexible display 107 is coupled to blade substrate 825 of blade 105 within the confines of silicone border 827. In an example, a first end of flexible display 107 is adhesively coupled to rigid portion 811 of blade substrate 825 of blade 105. The other end of flexible display 107 may be rigidly coupled to a tensioner by passing fasteners through apertures 809 of flexible substrate 805.

Figure 9:
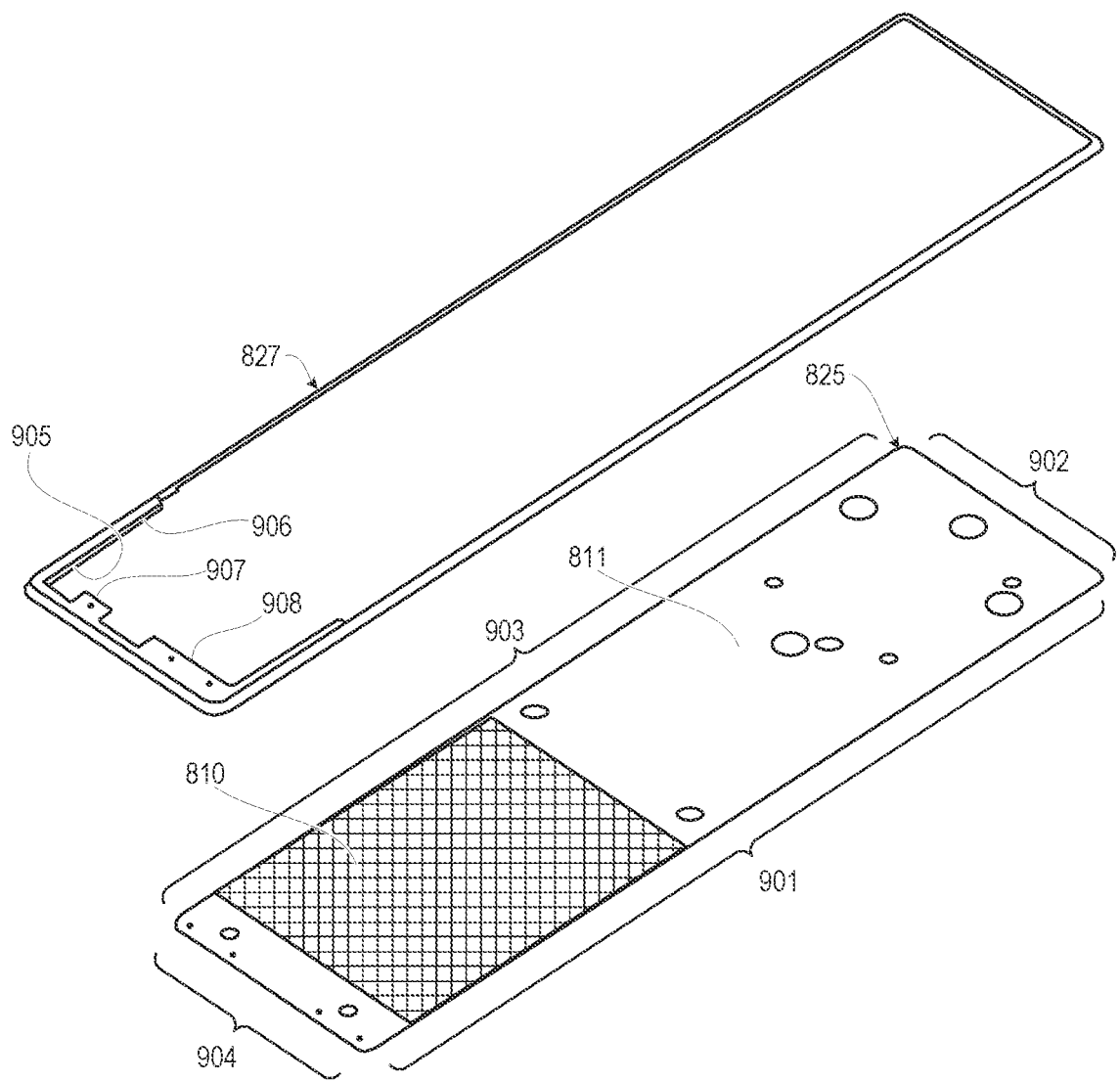
FIG. 9 depicts a blade substrate and a silicone border in an exploded view, according to one or more embodiments.

FIG. 9 depicts blade substrate 825 and silicone border 827 shown in an exploded view. Silicone border 827 defines a singular, contiguous, unitary piece of silicone. In the illustrative embodiment of FIG. 9, silicone border 827 surrounds three sides 901, 902, and 903 of blade substrate 825, and extends beyond minor side 904 to define receiving recess 905 that can accommodate mechanical and electrical components such as electronic circuit components to provide power and control for flexible display 107 (FIG. 8) that will situate within the perimeter defined by silicone border 827. A tensioner may keep flexible display 107 (FIG. 8) flat across flexible portion 810 of blade substrate 825, flexible circuits, and other components. In one or more embodiments, portions 906, 907, 908 of silicone border 827 extending beyond minor side 904 of blade substrate 825 surrounding receiving recess 905 are thicker than are the other portions of silicone border 827 that will surround flexible display 107 (FIG. 8), enabling components to be placed within receiving recess 905.

Figure 10:
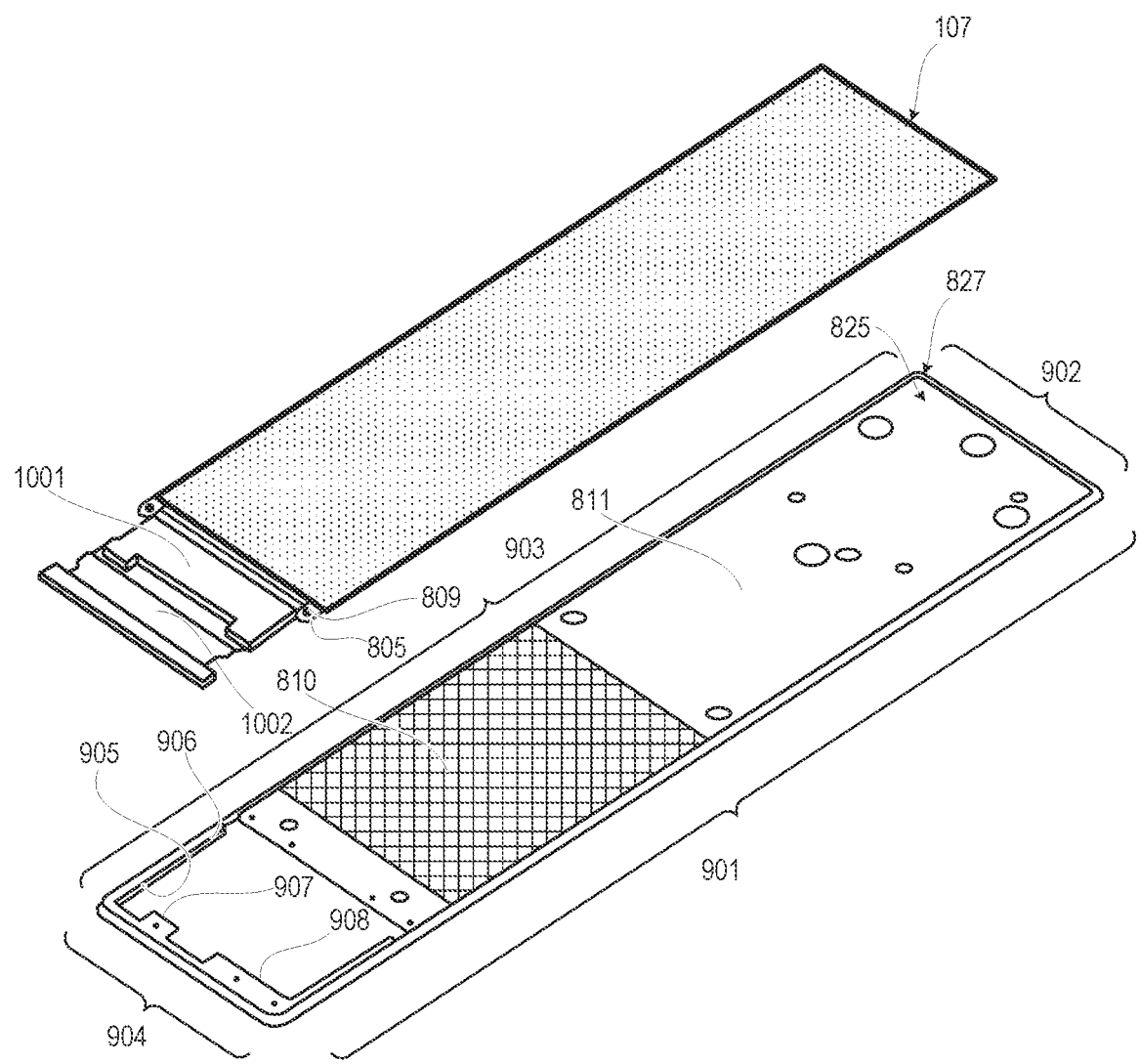
FIG. 10 depicts the flexible display and the blade with silicone border over-molded on the blade substrate, according to one or more embodiments.

FIG. 10 depicts flexible display 107 and blade 105 with silicone border 827 over-molded on blade substrate 825. Silicone border 827 surrounds three sides 901, 902, and 903 of blade substrate 825 and extends beyond minor side 904 to define receiving recess 905 that can accommodate mechanical and electrical components. Electronic circuits 1001 operable to provide power and control for flexible display 107 have been coupled to T-shaped tongue 808 of flexible display layer 803 (FIG. 8). Additionally, mechanical connector 1002 has been connected to the top of the T on T-shaped tongue 808. Flexible substrate 805 extends beyond a distal end of flexible display layer 803 (FIG. 8) so that apertures 809 defined therein can be coupled to a tensioner to ensure that flexible display 107 stays flat around flexible portion 810 of blade substrate 825 when flexible portion 810 of blade substrate 825 passes around a roller positioned at the end of device housing assembly 103 (FIG. 1A).

In one or more embodiments, blade 105 can be fixedly coupled to flexible display 107. In an example, flexible display 107 is coupled to rigid portion 811 by an adhesive or other coupling mechanism. A tensioner can then be positioned in receiving recess 905. In one or more embodiments, the tensioner rigidly couples with fasteners to the apertures 809 (FIG. 8) of flexible substrate 805 (FIG. 8) to keep flexible display 107 flat across flexible portion 810, regardless of how flexible portion 810 is being bent around the minor surface of device housing assembly 103 or a corresponding roller.

Figure 11:
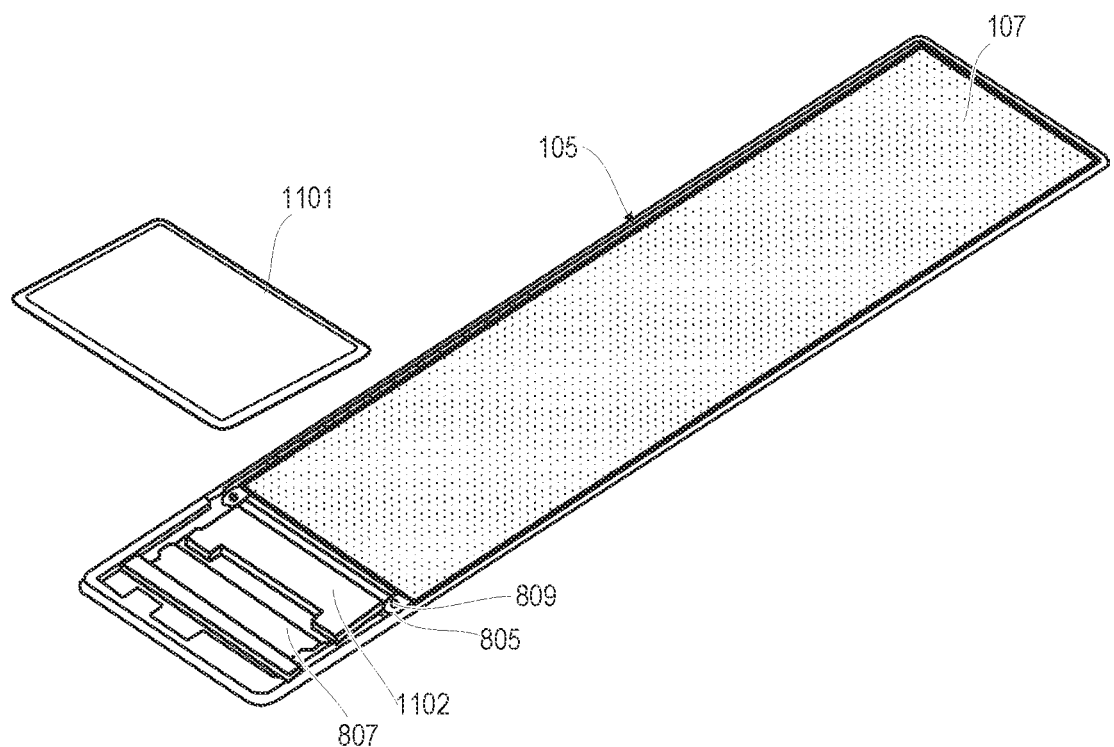
FIG. 11 depicts the flexible display after being coupled to the blade surrounded by a silicone border, according to one or more embodiments.
Figure 12:
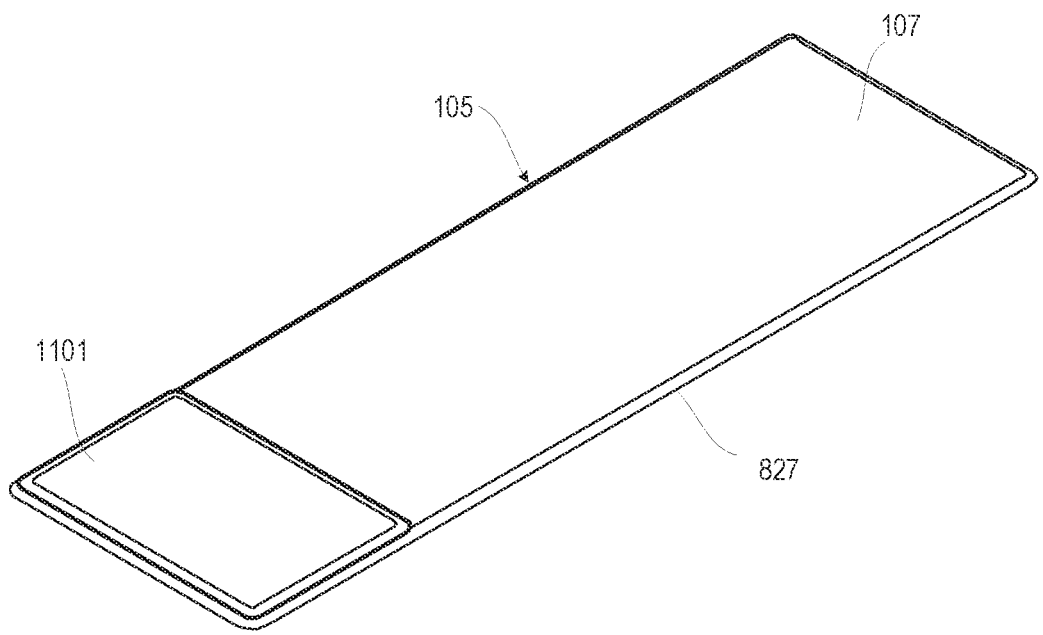
FIG. 12 depicts the blade assembly completely configured with a cover and in an unrolled state, according to one or more embodiments.

FIG. 11 depicts flexible display 107 after being coupled to blade 105. Silicone border 827 surrounds the flexible display 107, with silicone border 827 surrounding and abutting three sides of the flexible display layer (803). A flexible substrate is then connected to the electronic circuits 1001 carried by the T-shaped tongue 808. Additionally, a tensioner can be coupled to the flexible substrate 805. Thereafter, cover 1101 is attached to silicone border 827 atop the electronic circuits 1102 and other components situated on or around the T-shaped tongue 808. This portion of blade assembly 102 where the components are stored beneath cover 1101 may be referred to as the "backpack." FIG. 12 depicts blade assembly 102 completely configured with cover 1101.

Figure 13:
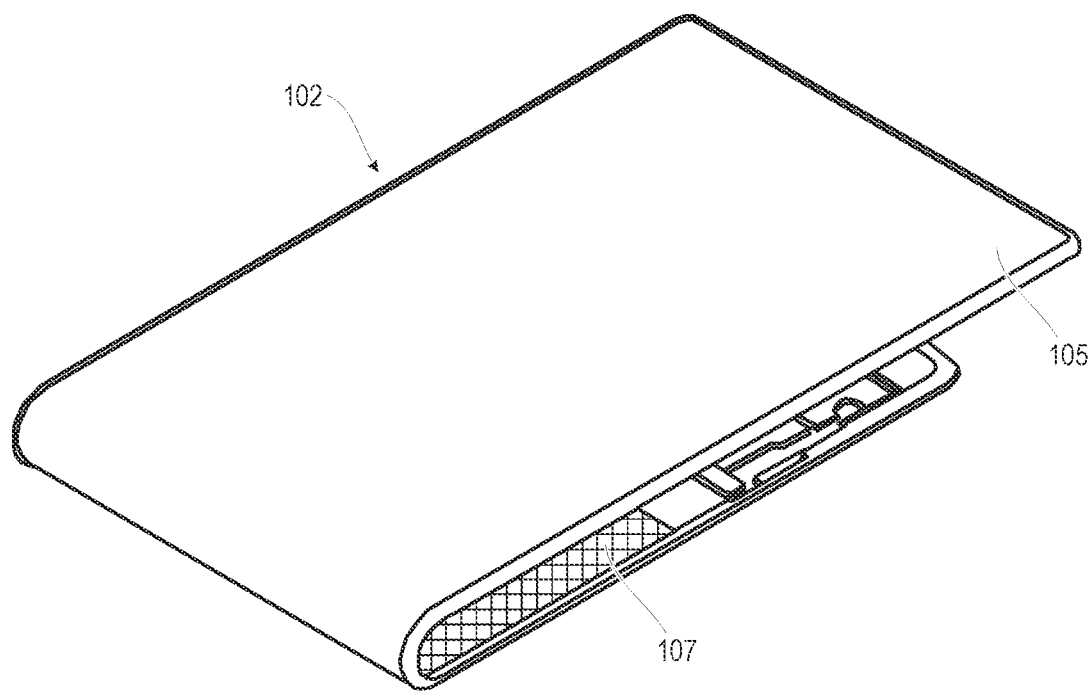
FIG. 13 depicts the blade assembly in a fully retracted state, according to one or more embodiments.
Figure 14:
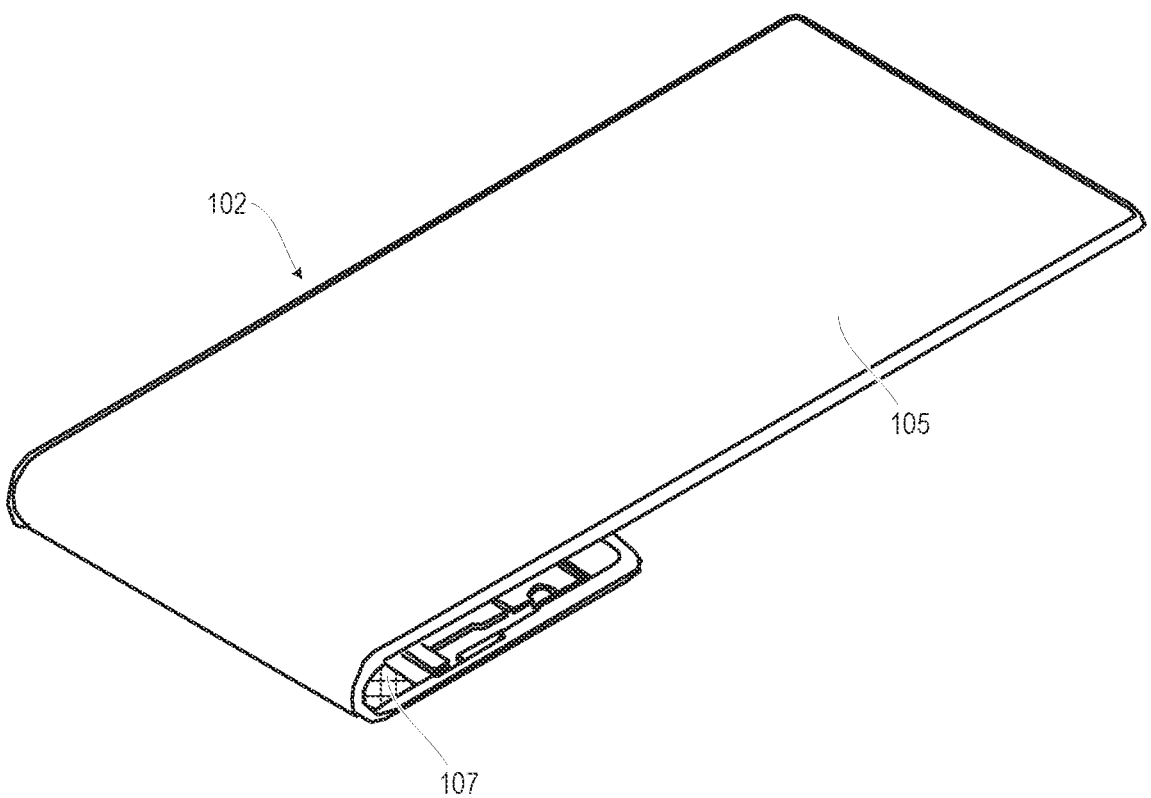
FIG. 14 depicts the blade assembly in a fully extended state, according to one or more embodiments.

FIG. 13 depicts blade assembly 102 in a fully retracted state. FIG. 14 depicts blade assembly 102 in a fully extended state. In one or more embodiments, flexible display 107 and blade 105 are configured to wrap around a minor surface of device housing assembly 103 (FIG. 1A) where a display roller mechanism is situated. In one or more embodiments, the display roller mechanism includes a roller that is positioned within a curvilinear section of flexible display 107 and blade 105. When placed within device housing assembly 103 (FIG. 1A), translation of translation mechanisms 106*a*-106*b* (FIG. 1A) causes translation of blade assembly 102, which in turn causes rotation of the roller. The result is a linear translation of the flexible display 107 and blade 105 across a translation surface of device housing assembly 103 (FIG. 1A) by drawing flexible display 107 and the blade 105 around the roller. As previously described, blade substrate 825 (FIG. 8) of blade assembly 102 includes flexible portion 810 (FIG. 8) that allows blade 105 and flexible display 107 to deform around device housing assembly 103 (FIG. 1A), corresponding to the respective points of rolling depicted in FIGS. 13-14.

Figure 15:
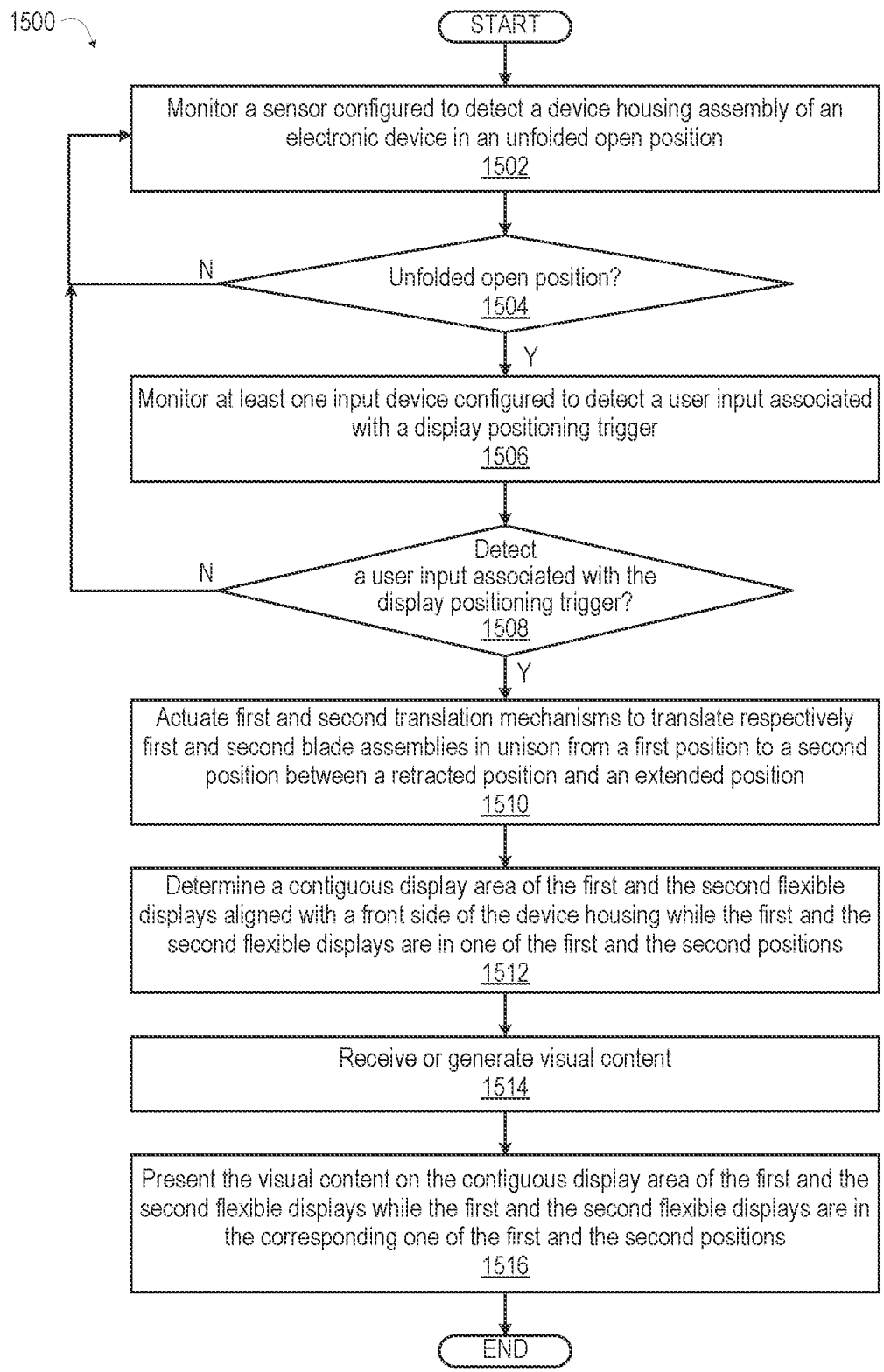
FIG. 15 is a flow diagram presenting a method of extending a display area up to four times the size of a collapsed state of an electronic device by extending two rollable displays while the device is in an unfolded state, according to one or more embodiments.
Figure 16:
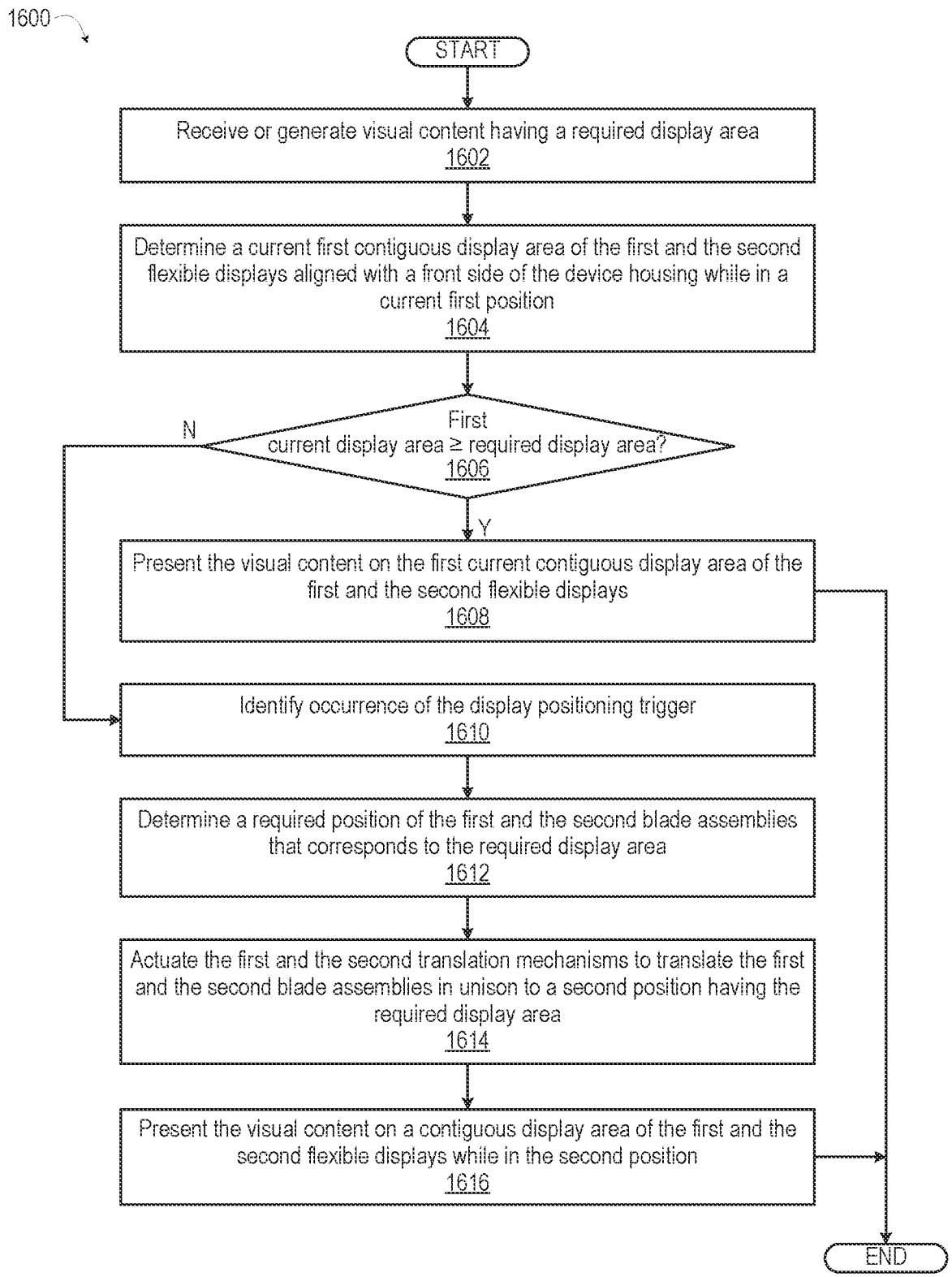
FIG. 16 is a flow diagram presenting a method that augments or replaces a manual display positioning trigger of the method of FIG. 15 by extending the two rollable displays in response to identifying an automatic display positioning trigger, according to one or more embodiments.

FIG. 15 is a flow diagram presenting method 1500 of extending a display to almost four times the size of a collapsed state of a foldable electronic device by extending two rollable displays of the foldable electronic device. Method 1500 includes a manual display positioning trigger that prompts the extension. FIG. 16 is a flow diagram presenting method 1600 that includes an automatic display positioning trigger that augments or replaces the manual display positioning trigger of method 1500 (FIG. 15). The descriptions of method 1500 (FIG. 15) and method 1600 (FIG. 16) are provided with general reference to the specific components illustrated within the preceding FIGS. 1A-1B, 2A-3C, 3A-3C, 4A-4B, 5A-5B, 6A-6B, 7A-7B and 8-14. Specific components referenced in method 1500 (FIG. 15) and method 1600 (FIG. 16) may be identical or similar to components of the same name used in describing preceding FIGS. 1A-1B, 2A-3C, 3A-3C, 4A-4B, 5A-5B, 6A-6B, 7A-7B and 8-14. In one or more embodiments, controller 108 (FIG. 1A) configures communication device 101 (FIGS. 1A-1B, 2A-3C, 3A-3C, 4A-4B, 5A-5B, 6A-6B, 7A-7B and 8-14) to provide the described functionality of method 1500 (FIG. 15) and method 1600 (FIG. 16).

With reference to FIG. 15, method 1500 includes monitoring a sensor configured to detect a device housing assembly of an electronic device in an unfolded open position (block 1502). The device housing assembly includes a hinge, coupling a first housing to a second housing. The first housing is pivotable about the hinge relative to the second housing between a folded closed position and the unfolded open position. Method 1500 includes determining whether the device housing assembly is in the unfolded open position (decision block 1504). In response to determining that the device housing assembly is not in the unfolded position, method 1500 returns to block 1502. In response to determining that the device housing assembly is in the unfolded position, method 1500 includes monitoring at least one input device configured to detect a user input associated with a display positioning trigger (block 1506). Method 1500 includes determining whether at least one display positioning trigger has occurred based on detecting a user input associated with the display positioning trigger (decision block 1508). In response to determining that the at least one display positioning trigger has not occurred, method 1500 returns to block 1502. In response to determining that the at least one display positioning trigger has occurred, method 1500 includes actuating first and second translation mechanisms to translate respectively first and second blade assemblies in unison from a first position to a second position between a retracted position and an extended position (block 1510). The first blade assembly carries a first blade and a first flexible display and is slidably coupled to the first housing to translate from one of a first adjacent side, an opposite side, and a second adjacent side to the hinge coupling. The first translation mechanism is operable to slide the first blade assembly relative to the first device housing between an extended position and a retracted position. The second blade assembly carries a second blade and a second flexible display and is slidably coupled to the second device housing to translate from a corresponding one of a first adjacent side, an opposite side, and a second adjacent side to the hinge coupling. The second translation mechanism is operable to slide the second blade assembly relative to the second device housing between an extended position and a retracted position. Method 1500 includes determining a contiguous display area of the first and the second flexible displays aligned with a front side of the device housing while the first and the second flexible displays are in one of the first and the second positions (block 1512). Method 1500 includes receiving or generating visual content (block 1514). Method 1500 includes presenting the visual content on the contiguous display area of the first and the second flexible displays while the first and the second flexible displays are in the corresponding one of the first and the second positions (block 1516). Then method 1500 ends.

In one or more embodiments, the first and the second blade assemblies translate from the opposite sides of the first and the second housings respectively. The extension in opposite directions may optimize landscape mode presentation.

In one or more embodiments, the first blade assembly translates from one of the first and the second adjacent side of the first housing. The parallel extension either up or down may optimize portrait mode presentation. The second blade assembly translates from a corresponding aligned one of the first and the second adjacent sides of the second housing. In one or more particular embodiments, the first blade assembly includes a first retractable rail attached to the first flexible display and extending proximate and adjacent to the second flexible display to maintain alignment of the first flexible display. The first translation mechanism includes a first gear mechanism that guides the first retractable rail to position the first flexible display. The second blade assembly includes a second retractable rail attached to the second flexible display and extending proximate and adjacent to the first flexible display to maintain alignment of the second flexible display. The second translation mechanism includes a second gear mechanism that guides the second retractable rail to position the second flexible display.

In one or more specific embodiments, the first retractable rail is distally attached to a distal end of the first flexible display. The second retractable rail is distally attached to a second distal end of the second flexible display. The first and the second gear mechanisms are passive gear mechanisms.

In one or more specific embodiments, the first translation mechanism includes a first blade motor that translates the first flexible display and a first transmission member that drives a first gear mechanism to translate the first rail in unison with the first flexible display. The second translation mechanism includes a second blade motor that translates the second flexible display and a second transmission member that drives a second gear mechanism to translate the second rail in unison with the second flexible display.

With reference to FIG. 16, method 1600 includes receiving or generating visual content having a required display area (block 1602). Method 1600 includes determining a current first contiguous display area of the first and the second flexible displays aligned with a front side of the device housing while in a current first position (block 1604). Method 1600 includes determining whether the first current display area is equal to or greater than the required display area (decision block 1606). In response to determining that the first current display area is equal to or greater than the required display area, method 1600 includes presenting the visual content on the first current contiguous display area of the first and the second flexible displays (block 1608). Then method 1600 ends. In response to determining that the first current display area is less than the required display area, method 1600 includes identifying an occurrence of the display positioning trigger (block 1610). Method 1600 includes determining a required position of the first and the second blade assemblies that corresponds to the required display area (block 1612). Method 1600 includes actuating the first and the second translation mechanisms to translate the first and the second blade assemblies in unison to a second position having the required display area (block 1614). Method 1600 includes presenting the visual content on a contiguous display area of the first and the second flexible displays while in the second position (block 1616). Then method 1600 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    a device housing assembly comprising:
        a first housing;
        a second housing; and
        a hinge coupling the first housing to the second housing, the first housing pivotable about the hinge relative to the second housing between a folded closed position and an unfolded open position;
    a sensor configured to detect the device housing assembly in an unfolded open position;
    a first blade assembly carrying a first blade and a first flexible display and slidably coupled to the first housing to translate from one of a first adjacent side, an opposite side and a second adjacent side to the hinge coupling;
    a first translation mechanism operable to slide the first blade assembly relative to the first device housing between an extended position and a retracted position;
    a second blade assembly carrying a second blade and a second flexible display and slidably coupled to the second device housing to translate from a corresponding one of a first adjacent side, an opposite side and a second adjacent side to the hinge coupling;
    a second translation mechanism operable to slide the second blade assembly relative to the second device housing between an extended position and a retracted position; and
    a controller communicatively coupled to the first and the second translation mechanisms and the sensor, and which:
        in response to determining, based on the sensor, that the device housing assembly is in the unfolded open position and in response to identifying an occurrence of at least one display positioning trigger, actuates the first and the second translation mechanisms to translate respectively the first and the second blade assemblies in unison from a first position to a second position between the retracted position and the extended position.

2. The electronic device of claim 1, further comprising at least one input device communicatively coupled to the controller and configured to detect a user input, and wherein the controller monitors the at least one input device for detecting a user input associated with the display positioning trigger.

3. The electronic device of claim 1, wherein the controller:
    receives or generates visual content having a required display area;
    identifies the occurrence of the display positioning trigger based on determining that a first contiguous display area of the first and the second flexible displays aligned with a front side of the device housing assembly in the first position is less than the required display area;
    determines a required position of the first and the second blade assemblies that corresponds to the required display area; and
    actuates the first and the second translation mechanisms to translate the first and the second blade assemblies in unison to the second position having the required display area.

4. The electronic device of claim 1, wherein the controller:
    determines a contiguous display area of the first and the second flexible displays aligned with a front side of the device housing while the first and the second flexible displays are in one of the first and the second positions;
    receives or generates visual content; and
    presents the visual content on the contiguous display area of the first and the second flexible displays while the first and the second flexible displays are in the corresponding one of the first and the second positions.

5. The electronic device of claim 1, wherein the first and the second blade assemblies translate from the opposite sides of the first and the second housings respectively.

6. The electronic device of claim 1, wherein:
    the first blade assembly translates from one of the first and the second adjacent side of the first housing; and
    the second blade assembly translates from a corresponding aligned one of the first and the second adjacent sides of the second housing.

7. The electronic device of claim 6, wherein:
    the first blade assembly comprises a first retractable rail attached to the first flexible display and extending proximate and adjacent to the second flexible display to maintain alignment of the first flexible display;

the first translation mechanism comprising a first gear mechanism that guides the first retractable rail to position the first flexible display;

the second blade assembly comprises a second retractable rail attached to the second flexible display and extending proximate and adjacent to the first flexible display to maintain alignment of the second flexible display; and the second translation mechanism comprising a second gear mechanism that guides the second retractable rail to position the second flexible display.

8. The electronic device of claim 7, wherein:
the first retractable rail has a first rail width orthogonal to the hinge and that substantially corresponds to a first width of the first flexible display; and
the second retractable rail has a second rail width orthogonal to the hinge and that substantially corresponds to a second width of the second flexible display.

9. The electronic device of claim 7, wherein:
the first retractable rail is distally attached to a distal end of the first flexible display;
the second retractable rail is distally attached to a second distal end of the second flexible display; and
the first and the second gear mechanisms are passive gear mechanisms.

10. The electronic device of claim 7, wherein:
the first translation mechanism comprises:
  a first blade motor that translates the first flexible display; and
  a first transmission member that drives a first gear mechanism to translate the first rail in unison with the first flexible display; and
the second translation mechanism comprises:
  a second blade motor that translates the second flexible display; and
  a second transmission member that drives a second gear mechanism to translate the second rail in unison with the second flexible display.

11. A method comprising:
monitoring a sensor configured to detect a device housing assembly of an electronic device in an unfolded open position, the device housing assembly comprising a hinge coupling a first housing to a second housing, the first housing pivotable about the hinge relative to the second housing between a folded closed position and the unfolded open position; and
in response to determining, based on the sensor, that the device housing assembly is in the unfolded open position and in response to identifying an occurrence of at least one display positioning trigger, actuating first and second translation mechanisms to translate respectively first and second blade assemblies in unison from a first position to a second position between a retracted position and an extended position, the first blade assembly carrying a first blade and a first flexible display and slidably coupled to the first housing to translate from one of a first adjacent side, an opposite side and a second adjacent side to the hinge coupling, the first translation mechanism operable to slide the first blade assembly relative to the first device housing between an extended position and a retracted position; the second blade assembly carrying a second blade and a second flexible display and slidably coupled to the second device housing to translate from a corresponding one of a first adjacent side, an opposite side and a second adjacent side to the hinge coupling, and the second translation mechanism operable to slide the second blade assembly relative to the second device housing between an extended position and a retracted position.

12. The method of claim 11, further comprising:
monitoring at least one input device configured to detect a user input associated with the display positioning trigger.

13. The method of claim 11, further comprising:
receiving or generating visual content having a required display area;
identifying the occurrence of the display positioning trigger based on determining that a first contiguous display area of the first and the second flexible displays aligned with a front side of the device housing assembly in the first position is less than the required display area;
determining a required position of the first and the second blade assemblies that corresponds to the required display area; and
actuating the first and the second translation mechanisms to translate the first and the second blade assemblies in unison to the second position having the required display area.

14. The method of claim 11, further comprising:
determining a contiguous display area of the first and the second flexible displays aligned with a front side of the device housing while the first and the second flexible displays are in one of the first and the second positions;
receiving or generating visual content; and
presenting the visual content on the contiguous display area of the first and the second flexible displays while the first and the second flexible displays are in the corresponding one of the first and the second positions.

15. The method of claim 11, wherein the first and the second blade assemblies translate from the opposite sides of the first and the second housings respectively.

16. The method of claim 11, wherein:
the first blade assembly translates from one of the first and the second adjacent side of the first housing; and
the second blade assembly translates from a corresponding aligned one of the first and the second adjacent sides of the second housing.

17. The method of claim 16, wherein:
the first blade assembly comprises a first retractable rail attached to the first flexible display and extending proximate and adjacent to the second flexible display to maintain alignment of the first flexible display;
the first translation mechanism comprising a first gear mechanism that guides the first retractable rail to position the first flexible display;
the second blade assembly comprises a second retractable rail attached to the second flexible display and extending proximate and adjacent to the first flexible display to maintain alignment of the second flexible display; and
the second translation mechanism comprising a second gear mechanism that guides the second retractable rail to position the second flexible display.

18. The method of claim 17, wherein:
the first retractable rail is distally attached to a distal end of the first flexible display;
the second retractable rail is distally attached to a second distal end of the second flexible display; and
the first and the second gear mechanisms are passive gear mechanisms.

19. The method of claim 17, wherein:
the first translation mechanism comprises:

a first blade motor that translates the first flexible display; and a first transmission member that drives a first gear mechanism to translate the first rail in unison with the first flexible display; and the second translation mechanism comprises:

a second blade motor that translates the second flexible display; and a second transmission member that drives a second gear mechanism to translate the second rail in unison with the second flexible display.

20. A non-transitory computer program product comprising: a non-transitory computer readable storage device; and program code on the non-transitory computer readable storage device that when executed by a processor associated with an electronic device, the program code enables the electronic device to provide functionality of: monitoring a sensor configured to detect a device housing assembly of the electronic device in an unfolded open position, the device housing assembly comprising a hinge coupling a first housing to a second housing, the first housing pivotable about the hinge relative to the second housing between a folded closed position and the unfolded open position; and in response to determining, based on the sensor, that the device housing assembly is in the unfolded open position and in response to identifying an occurrence of at least one display positioning trigger, actuating first and second translation mechanisms to translate respectively first and second blade assemblies in unison from a first position to a second position between a retracted position and an extended position, the first blade assembly carrying a first blade and a first flexible display and slidably coupled to the first housing to translate from one of a first adjacent side, an opposite side and a second adjacent side to the hinge coupling, the first translation mechanism operable to slide the first blade assembly relative to the first device housing between an extended position and a retracted position; the second blade assembly carrying a second blade and a second flexible display and slidably coupled to the second device housing to translate from a corresponding one of a first adjacent side, an opposite side and a second adjacent side to the hinge coupling, and the second translation mechanism operable to slide the second blade assembly relative to the second device housing between an extended position and a retracted position.

\* \* \* \* \*